US012050450B2

(12) United States Patent
Yamamoto et al.

(10) Patent No.: US 12,050,450 B2
(45) Date of Patent: Jul. 30, 2024

(54) MACHINE TOOL MANAGEMENT SYSTEM AND METHOD FOR MANAGING MACHINE TOOL

(71) Applicant: Yamazaki Mazak Corporation, Niwa-gun (JP)

(72) Inventors: Hiromasa Yamamoto, Niwa-gun (JP); Masatoshi Itoh, Niwa-gun (JP); Kenji Sano, Niwa-gun (JP); Tatsuya Matsuda, Niwa-gun (JP); Kento Yoshida, Niwa-gun (JP); Jumpei Kitayama, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 1259 days.

(21) Appl. No.: 16/718,182

(22) Filed: Dec. 18, 2019

(65) Prior Publication Data
US 2020/0125072 A1 Apr. 23, 2020

Related U.S. Application Data

(63) Continuation of application No. PCT/JP2017/022738, filed on Jun. 20, 2017.

(51) Int. Cl.
G05B 19/4063 (2006.01)

(52) U.S. Cl.
CPC .......... *G05B 19/4063* (2013.01); *G05B 2219/31047* (2013.01); *G05B 2219/31336* (2013.01);
(Continued)

(58) Field of Classification Search
None
See application file for complete search history.

(56) References Cited

U.S. PATENT DOCUMENTS

| 5,243,533 A | 9/1993 | Takagi et al. |
| 2007/0282557 A1 | 12/2007 | Uchida et al. |

(Continued)

FOREIGN PATENT DOCUMENTS

| CN | 102452022 | 5/2012 |
| CN | 103914044 | 7/2014 |

(Continued)

OTHER PUBLICATIONS

International Search Report for corresponding International Application No. PCT/JP2017/022738, Aug. 29, 2017.
(Continued)

*Primary Examiner* — Sean Shechtman
(74) *Attorney, Agent, or Firm* — MORI & WARD, LLP

(57) ABSTRACT

A machine tool management system includes a machine tool, a memory, a display, and a control circuit. The control circuit is configured to record, in the memory, a time point at which detection information with respect to a machine tool is detected and the detection information corresponding to the time point; determine selected detection information among the detection information to satisfy a determination condition; record, in the memory, the selected detection information corresponding to the time point; display a list of the selected detection information according to predetermined display items; extract from the memory at least part of the detection information including one of the selected detection information corresponding to one display item selected among the display items listed on the display; and to display a graph of a change over time in data included in the at least part of the detection information.

11 Claims, 22 Drawing Sheets

(52) U.S. Cl.
CPC .............. *G05B 2219/50206* (2013.01); *G05B 2219/50299* (2013.01)

(56) References Cited

U.S. PATENT DOCUMENTS

| | | | | |
|---|---|---|---|---|
| 2009/0326680 | A1* | 12/2009 | Landgraf | ........... G05B 19/4068 700/83 |
| 2012/0093598 | A1 | 4/2012 | Ando et al. | |
| 2014/0022086 | A1 | 1/2014 | Tezuka et al. | |
| 2014/0244024 | A1 | 8/2014 | Tezuka | |
| 2016/0033955 | A1 | 2/2016 | Satake et al. | |
| 2016/0110611 | A1 | 4/2016 | Hasegawa | |
| 2016/0291576 | A1 | 10/2016 | Nakamura | |
| 2016/0346891 | A1 | 12/2016 | Ando | |
| 2017/0038761 | A1 | 2/2017 | Ando et al. | |

FOREIGN PATENT DOCUMENTS

| | | |
|---|---|---|
| CN | 104483902 | 4/2015 |
| CN | 106181581 | 12/2016 |
| JP | 63-259702 | 10/1988 |
| JP | 06-131025 | 5/1994 |
| JP | 07-152411 | 6/1995 |
| JP | 11-95820 | 4/1999 |
| JP | 2000-293219 | 10/2000 |
| JP | 2007-004601 | 1/2007 |
| JP | 2007-328431 | 12/2007 |
| JP | 2009-129395 | 6/2009 |
| JP | 2014-021769 | 2/2014 |
| JP | 2014-164597 | 9/2014 |
| JP | 2015-229216 | 12/2015 |
| JP | 2016-31643 | 3/2016 |
| JP | 2016-81324 | 5/2016 |
| JP | 2017-033346 | 2/2017 |
| WO | WO 2015/092853 | 6/2015 |

OTHER PUBLICATIONS

Written Opinion for corresponding International Application No. PCT/JP2017/022738, Aug. 29, 2017.
Japanese Office Action for corresponding JP Application No. 2017-558575, Dec. 26, 2017 (w/ English machine translation).
Chinese Office Action for corresponding CN Application No. 201780074226.8, Oct. 8, 2019, (w/ English machine translation).
Extended European Search Report for corresponding EP Application No. 17914175.9-1219, Aug. 12, 2019.

* cited by examiner

FIG. 12

| time | d1-1 | d1-2 | d1-3 | d1-4 | d1-5 | d1-6 | ... | d1-N |
|---|---|---|---|---|---|---|---|---|
| yy/mm/dd hh:mm:ss | xxxxx | xxxxx | xxxxx | xxxxx | xxxxx | xxxxx | xxxxx | xxxxx |
| yy/mm/dd hh:mm:ss | xxxxx | xxxxx | xxxxx | xxxxx | xxxxx | xxxxx | xxxxx | xxxxx |
| yy/mm/dd hh:mm:ss | xxxxx | xxxxx | xxxxx | xxxxx | xxxxx | xxxxx | xxxxx | xxxxx |
| yy/mm/dd hh:mm:ss | xxxxx | xxxxx | xxxxx | xxxxx | xxxxx | xxxxx | xxxxx | xxxxx |
| yy/mm/dd hh:mm:ss | xxxxx | xxxxx | xxxxx | xxxxx | xxxxx | xxxxx | xxxxx | xxxxx |
| yy/mm/dd hh:mm:ss | xxxxx | xxxxx | xxxxx | xxxxx | xxxxx | xxxxx | xxxxx | xxxxx |

Data:

FIG. 13

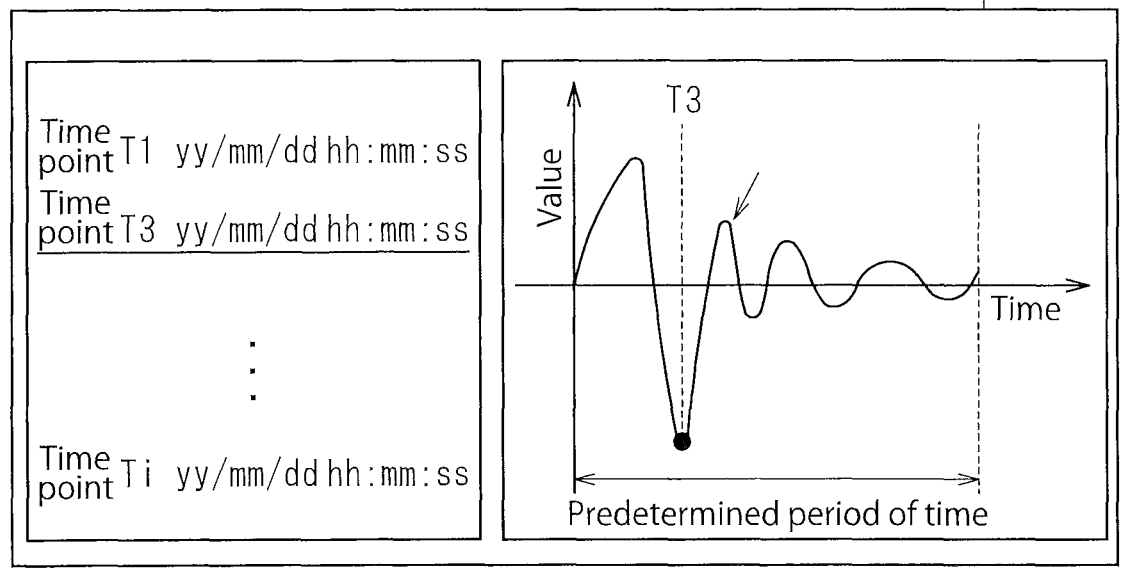

Search

Search results

| Time point T3 | yy/mm/dd hh:mm:ss |
| Time point T5 | yy/mm/dd hh:mm:ss |
| Time point T9 | yy/mm/dd hh:mm:ss |

Selected detection information

| Time point T1 | yy/mm/dd hh:mm:ss |
| Time point T3 | yy/mm/dd hh:mm:ss |

⋮

| Time point Ti | yy/mm/dd hh:mm:ss |

FIG. 20

Search s1
[ ▽ ]

Search s2
[ ▽ ]

Add search conditions

| Time point T1 | yy/mm/dd hh:mm:ss |
| Time point T3 | yy/mm/dd hh:mm:ss |
| ⋮ | |
| Time point Ti | yy/mm/dd hh:mm:ss |

4B

MACHINE TOOL MANAGEMENT SYSTEM AND METHOD FOR MANAGING MACHINE TOOL

CROSS-REFERENCE TO RELATED APPLICATIONS

The present application is a continuation application of International Application No. PCT/JP2017/022738, filed Jun. 20, 2017. The contents of this application are incorporated herein by reference in their entirety.

BACKGROUND OF THE INVENTION

Field of the Invention

The present invention relates to a machine tool management system and a method for managing a machine tool.

Discussion of the Background

Machine tools machine workpieces by turning the workpieces and/or tools. Also, there exist systems to manage data obtained from machine tools while the machine tools are in operation (JP 2007-4601A, JP 2015-229216A, and JP 2017-33346A).

SUMMARY OF THE INVENTION

According to one aspect of the present invention, a machine tool management system includes a machine tool, a memory, a display, and a control circuit. The machine tool is configured to machine a workpiece. The control circuit is connected to the memory. The control circuit is configured to record, in the memory, a time point at which detection information with respect to the machine tool has been detected and the detection information corresponding to the time point. The control circuit is configured to determine selected detection information among the detection information, the selected detection information satisfying a determination condition. The control circuit is configured to record, in the memory, the selected detection information corresponding to the time point. The control circuit is configured to display, on the display, a list of the selected detection information according to predetermined display items. The control circuit is configured to extract from the memory at least part of the detection information including one of the selected detection information corresponding to one display item selected among the display items listed on the display. The control circuit is configured to display, on the display, a graph of a change over time in data included in the at least part of the detection information such that data included in the one of the selected detection information is distinguishable in the graph.

According to another aspect of the present invention, a method for managing a machine tool includes recording, in the memory, a time point at which detection information with respect to the machine tool has been detected and the detection information corresponding to the point in time, and determining selected detection information among the detection information. The selected detection information satisfies a determination condition. The selected detection information corresponding to the point in time is recorded in the memory. A list of the selected detection information according to predetermined display items is displayed on the display. At least part of the detection information including one of the selected detection information corresponding to one display item selected among the display items listed on the display is extracted from the memory. A graph of a change over time in data included in the at least part of the detection information is displayed on the display such that data included in the one of the selected detection information is distinguishable in the graph.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 12 illustrates another example content displayed on the display;

FIG. 13 illustrates another example content displayed on the display;

FIG. 18 illustrates another example content displayed on the display;

FIG. 20 illustrates another example content displayed on the display;

DESCRIPTION OF THE EMBODIMENTS

Figure 1:
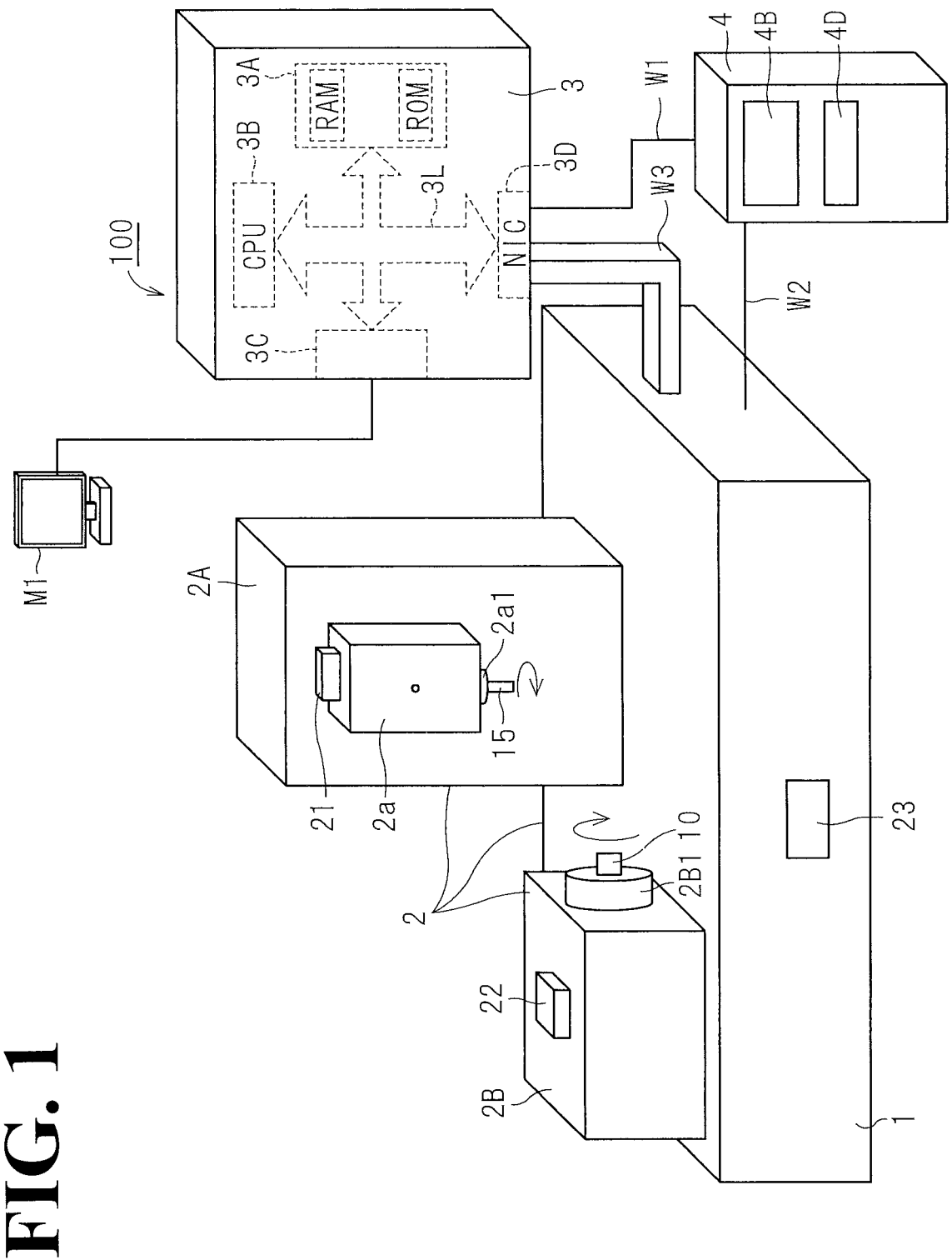
FIG. 1 illustrates a schematic configuration of a machine tool management system according to an embodiment.

The embodiments will now be described with reference to the accompanying drawings, wherein like reference numerals designate corresponding or identical elements throughout the various drawings.

Embodiment 1

FIG. 1 illustrates a schematic configuration of a machine tool management system 100 according to embodiment 1.

As illustrated in FIG. 1, the machine tool management system 100 includes a machine tool 2, an NC (Numerical Control) unit 3, and a management apparatus 4.

As illustrated in FIG. 1, the machine tool 2 includes: a base 1; a carriage 2A, which includes a tool headstock 2a; and a workpiece headstock 2B.

On the base 1, the carriage 2A, the workpiece headstock 2B, and the NC unit 3 are disposed. The carriage 2A is movably disposed on the upper surface of the base 1. The workpiece headstock 2B is fixed to the upper surface of the base 1. The tool headstock 2a is movably disposed on a side wall of the carriage 2A. Thus, the tool headstock 2a is movable relative to the workpiece headstock 2B.

The machine tool 2 machines a workpiece 10. A configuration of the machine tool 2 will be described below.

As illustrated in FIG. 1, a tool spindle 2a1 is rotatably mounted on the tool headstock 2a. The tool spindle 2a1 is attached with a tool 15. A workpiece spindle 2B1 is rotatably mounted on the workpiece headstock 2B. The workpiece spindle 2B1 is attached with the workpiece (to-be-machined object) 10.

In machining the workpiece 10, the machine tool 2 rotates the tool spindle 2a1 and/or the workpiece spindle 2B1, thereby rotating the tool 15 and/or the workpiece 10. For example, by bringing the rotating tool spindle 2a1 and/or another spindle into contact with the workpiece 10, the workpiece 10 is subjected to desired cutting or another machining.

The machine tool management system 100 also includes a detector that detects at least one physical quantity of the machine tool 2 (while the machine tool 2 is working on machining and while the machine tool 2 is not working on machining) For example, as illustrated in FIG. 1, the machine tool management system 100 includes, as the detector, a tool sensor unit 21, a workpiece sensor unit 22, and a base sensor unit 23.

The tool sensor unit 21 is disposed on the tool headstock 2a. The tool sensor unit 21 includes a plurality of sensors. The sensors of the tool sensor unit 21 measure and detect physical quantities that occur on the side of the tool. For example, the tool sensor unit 21 measures and detects: values of vibration in the tool spindle 2a1 (for example, vibration acceleration, vibration displacement, and vibration velocity); tool-side spindle load on the tool spindle 2a1; the rotational frequency of the tool spindle 2a1; and feed shaft load on the side of the tool spindle 2a1.

For example, the tool sensor unit 21 includes the following sensors.

The tool sensor unit 21 includes: an acceleration sensor that measures vibration; a rotary encoder that detects rotation angles and rotation speeds of the tool spindle 2a1/feed shaft; and a linear encoder that detects positions of the tool headstock 2a/carriage 2A. It is also possible to calculate positions of the tool headstock 2a/carriage 2A using the rotary encoder of the feed shaft, instead of using the linear encoder.

The tool sensor unit 21 also includes elements such as: a temperature sensor that measures temperatures of the tool spindle 2a1/feed shaft motor; and a temperature sensor that measures temperatures of the tool headstock 2a/carriage 2A/feed shaft. The former temperature sensor is incorporated in a motor, for example. The latter temperature sensor is implemented in the form of a thermocouple, for example, embedded at desired positions in the tool headstock 2a/carriage 2A/feed shaft.

The tool sensor unit 21 also includes sensors that measure values of current flowing through amplifiers that control motors. Measured current values are used to detect spindle load and feed shaft load.

The workpiece sensor unit 22 is mounted on the workpiece headstock 2B. The workpiece sensor unit 22 includes a plurality of sensors. The sensors of the workpiece sensor unit 22 measure and detect physical quantities that occur on the side of the workpiece. For example, the workpiece sensor unit 22 measures and detects: values of vibration in the workpiece spindle 2B1 (for example, vibration acceleration, vibration displacement, and vibration velocity); workpiece-side spindle load on the workpiece spindle 2B1; the rotational frequency of the workpiece spindle 2B1; and feed shaft load on the side of the workpiece spindle 2B1.

For example, the workpiece sensor unit 22 includes the following sensors.

The workpiece sensor unit 22 includes: an acceleration sensor that measures vibration; and a rotary encoder that detects rotation angle and rotation speed of the workpiece spindle 2B1.

The workpiece sensor unit 22 also includes elements such as: a temperature sensor that measures temperature of the spindle motor; and a temperature sensor that measures temperature of the workpiece headstock 2B. The former temperature sensor is incorporated in a motor, for example. The latter temperature sensor is implemented in the form of a thermocouple, for example, embedded at desired positions in the workpiece headstock 2B.

The workpiece sensor unit 22 also includes a sensor that measures values of current flowing through an amplifier that controls a workpiece spindle motor. Measured current values are used to detect spindle load.

The base sensor unit 23 is mounted on the base 1. The base sensor unit 23 includes a plurality of sensors. The sensors of the base sensor unit 23 measure and detect physical quantities that occur on the side of the base. For example, the base sensor unit 23 measures and detects: values of vibration in the base 1 (for example, vibration acceleration, vibration displacement, and vibration velocity); flow rate of a liquid and/or another fluid; and temperature occurring in the base 1.

For example, the base sensor unit 23 includes the following sensors.

The base sensor unit 23 includes elements such as: an acceleration sensor that measures vibration of the base 1; temperature sensors that respectively measure temperature of the base 1, temperature of coolant, and factory environment temperature; a flow rate sensor that measures flow rate of coolant; and a pressure sensor that measures pressure of operating oil. Each of temperature sensors is implemented in the form of a thermocouple, for example, embedded at a desired position.

The sensors units 21, 22, and 23 are communicatively connected to the management apparatus 4. This configuration ensures that detection results obtained by the sensors units 21, 22, and 23 are transmitted to the management apparatus 4. It is to be noted that the sensors units 21, 22, and 23 are also communicatively connected to the NC unit 3. This configuration ensures that the detection results can also be transmitted to the NC unit 3. The detection results are included, in the form of data, detection information, described later.

Next, a configuration of the NC unit 3 will be described.

The NC unit 3 is attached to the base 1. The NC unit 3 is communicatively connected to the machine tool 2. As described above, the NC unit 3 is also communicatively connected to the sensors units 21, 22, and 23.

The NC unit 3 controls the machine tool 2. In the NC unit 3, a plurality of pieces of information associated with machining of the machine tool 2 are set and registered. Also in the NC unit 3, a plurality of machining programs are set. For example, a machining program may be prepared by a user based on the object to be machined, and registered in the NC unit 3. It is to be noted that when predetermined to-be-machined objects are used, a predetermined machining program may be set in the NC unit 3 as initial setting.

Based on the machining program, the NC unit 3 controls the operation of machining the machine tool 2. The machining program specifies details of how the machine tool 2 machines the workpiece 10 (for example: type of the tool 15 to be used; procedure for the machining; positions that the tool spindle 2a1 passes; movement paths that the tool spindle 2a1 takes; and machining positions and machining paths on the workpiece 10 attached to the workpiece spindle 2B1).

As illustrated in FIG. 1, the NC unit 3 includes a memory 3A, which includes RAM and ROM. The memory 3A stores various kinds of data. For example, the memory 3A stores various kinds of setting-register data including a plurality of machining programs. It is also possible to store in the memory 3A the detection results transmitted from the sensors units 21, 22, and 23.

Also as illustrated in FIG. 1, the NC unit 3 includes control circuit (CPU) 3B. The control circuit 3B is connected to the memory 3A. The control circuit 3B reads a machining program stored in the memory 3A and controls the machine tool 2 based on the machining program.

Also as illustrated in FIG. 1, the NC 3 includes a display section 3C and an NIC (Network manipulation section Card) 3D. The memory 3A, the control circuit 3B, the display section 3C, and the NIC 3D are communicatively connected to each other through a bus 3L. It is to be noted that the display section 3C may be a touchscreen so that the display section 3C itself displays a predetermined content, or that the display section 3C may display a predetermined content on a monitor M1, which is connected to the display section 3C as illustrated in FIG. 1.

For example, a user may manipulate a touchscreen display section 3C or a manipulation button connected to the NC unit 3 to prepare a machining program and/or change various kinds of setting. For further example, a user may manipulate a touchscreen display section 3C or a manipulation button connected to the NC unit 3 to directly manipulate the machine tool 2.

The NC unit 3 also functions as an alarm raiser that raises an alarm associated with the machine tool 2 (while the machine tool 2 is working on machining and while the machine tool 2 is not working on machining) In other words, the NC unit 3 is a controller that includes an alarm raiser.

In the NC unit 3, which is an alarm raiser, the control circuit 3B determines whether an abnormality is occurring in, for example, machining using the machine tool 2. That is, the NC unit 3 is capable of detecting an occurrence of an abnormality in the machine tool 2. The control circuit 3B determines and/or detects whether an abnormality exists based on physical quantities transmitted from the machine tool 2 and the sensors units 21, 22, and 23. In other words, the NC unit 3 determines whether it is necessary to raise an alarm for an abnormality.

For example, the control circuit 3B compares various detection results detected in the machine tool 2, including the base 1 (for example, current value, temperature, and flow rate value) with alarm thresholds set in advance in the memory 3A (for example, alarm threshold current value, alarm threshold temperature, and alarm threshold flow rate value).

When, as a result of the comparison, the control circuit 3B has determined that a detection result is in excess of a corresponding alarm threshold, the control circuit 3B detects an "abnormality" and determines that it is necessary to make a notification such as an alarm. Specifically, for example, when the control circuit 3B has detected, in the machine tool 2: an excessive amount of current value due to an abnormal load; an abnormal increase in temperature; or a leakage of a fluid, then the control circuit 3B determines that there is an abnormality, and raises an alarm.

Next, the management apparatus 4 will be described.

For example, as illustrated in FIG. 1, the management apparatus 4 is located at some distance from elements such as the machine tool 2. It is to be noted that the management apparatus 4 and the NC unit 3 may be implemented in the same apparatus or device, as opposed to the configuration illustrated in FIG. 1.

In the example configuration of FIG. 1, the management apparatus 4 is communicatively connected to the NC unit 3 through a communication line W1. In another possible configuration, the management apparatus 4 and the NC unit 3 may be connected to each other in a wirelessly communicative manner, as opposed to the configuration illustrated in FIG. 1. Also in the example configuration of FIG. 1, the management apparatus 4 is also communicatively connected to the machine tool 2 and the sensors units 21, 22, and 23 through a communication line W2. It is to be noted that the management apparatus 4 may be communicatively connected to the sensors units 21, 22, and 23 through the NC unit 3.

Data stored in the management apparatus 4 may be transferred to a large capacity server through a LAN (Local Area Network) or the Internet and stored in the large capacity server.

The management apparatus 4 obtains and manages a plurality of detection information detected while the machine tool 2 is working on machining and while the machine tool 2 is not working on machining. The management apparatus 4 also analyzes the detection information. The management apparatus 4 also displays various kinds of information including the result of the analysis. It is to be noted that the detection information will be described later.

Figure 2:
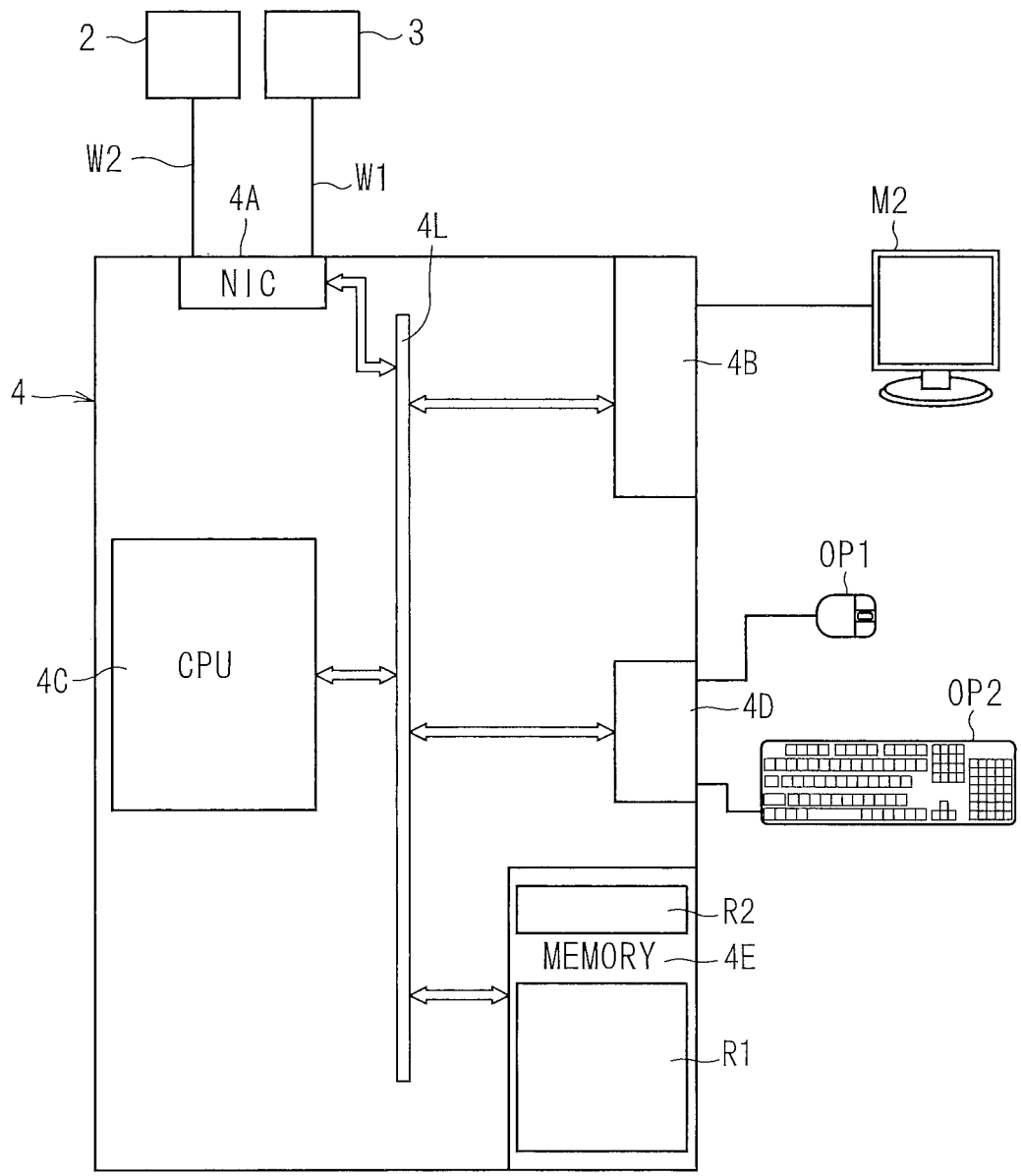
FIG. 2 illustrates a schematic configuration of the inside of a management apparatus.

In the machine tool management system 100 according to this embodiment, the management apparatus 4 has the configuration illustrated in FIG. 2. FIG. 2 illustrates an internal configuration of the management apparatus 4.

As illustrated in FIG. 2, the management apparatus 4 includes a communication unit (NIC) 4A, a display 4B, a control circuit (CPU) 4C, a manipulation section 4D, and a memory 4E. In the management apparatus 4, the communication unit 4A, the display 4B, the control circuit 4C, the manipulation section 4D, and the memory 4E are communicatively connected to each other through a system bus 4L.

For example, elements such as the system bus 4L, the communication unit 4A, the display 4B, the control circuit 4C, the manipulation section 4D, and the memory 4E are electrically mounted on a substrate. The system bus 4L, the communication unit 4A, the display 4B, the control circuit 4C, the manipulation section 4D, the memory 4E, and the substrate constitute a circuit that implements the functions of the management apparatus 4.

The communication unit 4A is controlled by the control circuit 4C. The communication unit 4A is connected to the NC unit 3 through the communication line W1. The communication unit 4A is also connected to the machine tool 2 and the sensors units 21, 22, and 23 through the communication line W2. Thus, the communication unit 4A is capable of transmitting and receiving data to and from the machine tool 2, the NC unit 3, and the sensors units 21, 22, and 23.

The display 4B is controlled by the control circuit 4C. The display 4B displays various kinds of information using, for example, the screen of a monitor M2.

The manipulation section 4D is controlled by the control circuit 4C. The manipulation section 4D also receives a manipulation (such as input of a command, input of setting information, and input of selected information) from a user or some other person through, for example, a mouse OP1 and/or a keyboard OP2. It is to be noted that a touchscreen display 4B may be provided so that the manipulation section 4D can be incorporated in the display 4B.

The control circuit 4C includes a central processing unit (CPU) and a memory controller.

The memory 4E includes a read-only memory (ROM) and a random access memory (RAM). The ROM includes a non-temporary recording medium. The RAM includes a temporary recording medium. The memory 4E includes a plurality of storage areas R1 and R2, each having an address.

The control circuit 4C controls the memory 4E to store data in the storage areas R1 and R2 of the memory 4E. The control circuit 4C also controls the memory 4E to read data from the storage areas R1 and R2 of the memory 4E.

In the storage area R1 in the memory 4E, a plurality of pieces of detection information detected from the machine tool 2 (while the machine tool 2 is working on machining and while the machine tool 2 is not working on machining) are recorded. Each piece of detection information is recorded in the storage area R1 in the memory 4E in relation to the time point at which the detection information was detected (for example, date and time).

In the storage area R2 in the memory 4E, a plurality of pieces of selected detection information are recorded. Each piece of selected detection information is recorded in the storage area R2 in the memory 4E in relation to the time point at which the selected detection information was detected (for example, date and time). It is to be noted that the selected detection information refers to detection information that satisfies a predetermined determination condition.

Detection information will now be described.

While the machine tool 2 is working on machining and while the machine tool 2 is not working on machining, the sensors units 21, 22, and 23 detect at least one physical quantity. The management apparatus 4 obtains, as part of detection information, the physical quantity detected by the sensor units 21, 22, and 23. Thus, the detection information obtained at the management apparatus 4 includes data of the physical quantity detected by the sensor units 21, 22, and 23.

Also while the machine tool 2 is working on machining and while the machine tool 2 is not working on machining, the NC unit 3, which serves as an alarm raiser, detects the presence or absence of an alarm in the NC unit 3. When an alarm has been raised, the NC unit 3 itself detects the type of the alarm. The management apparatus 4 obtains, as part of detection information, alarm information (such as the presence or absence of an alarm, and the type of the alarm) associated with the alarm detected by the NC unit 3. Thus, the detection information obtained at the management apparatus 4 includes data of the alarm information associated with the alarm detected by the NC unit 3.

The NC unit 3 also executes a machining program to control the operation of machining the machine tool 2. The NC unit 3 detects pieces of machining condition information specified in the machining program that is being executed. The management apparatus 4 obtains, as part of detection information, the pieces of machining condition information detected by the NC unit 3. Thus, the detection information obtained at the management apparatus 4 includes data of the pieces of machining condition information detected by the NC unit 3.

Figure 3:
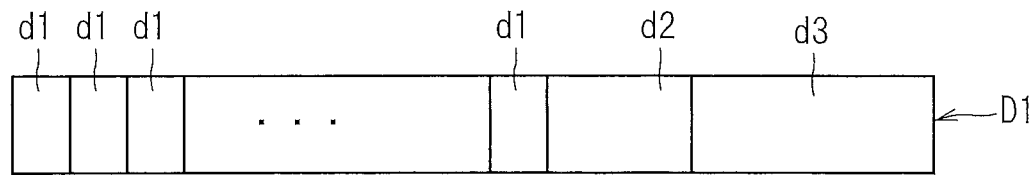
FIG. 3 illustrates an example configuration of detection information.

FIG. 3 schematically illustrates an example configuration of detection information.

As illustrated in FIG. 3, detection information D1 is made up of a plurality of pieces of physical quantity data d1, alarm data (alarm information) d2, and machining condition data (machining condition information) d3.

The detection information D1 illustrated in FIG. 3 is information detected (obtained) at, for example, time point T1, which is while the machine tool 2 is working on machining. It is to be noted that the data d1 to d3 constituting the detection information D1 will not be limited to the above-described data but may include other data detected (obtained) at the time point at which the detection information D1 was detected.

The physical quantity data d1 illustrated in FIG. 3 are data of machining-related physical quantities detected by the sensor units 21, 22, and 23 at the time point T1, which is while the machine tool 2 is working on machining.

Examples of the physical quantity data d1 include: physical quantities that occur at the tool spindle 2a1 (detected by the tool sensor unit 21 at the time point T1, such as vibration acceleration, vibration displacement, vibration velocity, tool-side spindle load, and the spindle rotational frequency); physical quantities that occur at the workpiece spindle 2B1 (detected by the workpiece sensor unit 22 at the time point T1, such as vibration acceleration, vibration displacement, vibration velocity, workpiece-side spindle load, and the spindle rotational frequency); and other physical quantities (physical quantities detected by the base sensor unit 23 at the time point T1, such as vibration acceleration, vibration displacement, and vibration velocity; physical quantities that occur at the base 1 and detected at the time point T1, such as flow rate values of various liquids and fluids; and physical quantities that occur at the base 1 and detected at the time point T1, such as temperature).

It is to be noted that the number and/or kind of physical quantity data d1 included in the detection information D1 may freely be selected by a user.

The alarm data d2 illustrated in FIG. 3 is made up of data of information associated with an alarm detected by the NC unit 3, which functions as an alarm raiser, at the time point T1, which is while the machine tool 2 is working on machining.

For example, the alarm data d2 includes data indicating the presence or absence of an alarm detected at the time point T1. When an alarm has been raised at the time point T1, the alarm data d2 includes data indicating the type of the alarm (for example, data that identifies which part of the machine tool management system 100 has caused the alarm and that identifies why the alarm has been raised).

The machining condition data d3 illustrated in FIG. 3 is data associated with machining conditions detected (obtained) by the NC unit 3 at the time point T1, which is while the machine tool 2 is working on machining, from the machining program executed at the NC unit 3.

For example, the machining condition data d3 includes program identification data that identifies the machining program executed at the time point T1. The machining condition data d3 also includes tool identification data that indicates the type of the tool 15 used by the machine tool 2 at the time point T1. The machining condition data d3 also includes workpiece identification data that indicates the type of the workpiece 10 machined by the machine tool 2 at the time point T1. The machining condition data d3 also includes effective block identification data that indicates the type of the block worked on by the machine tool 2 at the time point T1.

Next, a method for managing a machine tool (that is, a management method using the machine tool management system 100) will be described.

First, by referring to the flowchart illustrated in FIG. 4, description will be made with regard to how to store detection information and selected detection information in the machine tool management system 100.

The management apparatus 4 is instructed to start detection information obtaining processing. Then, the control circuit 4C reads data obtaining browsing software stored in the memory 4E. Then, the control circuit 4C performs control based on the data obtaining software (see START in FIG. 4).

In the memory 4E, various preset thresholds are recorded. The control circuit 4C reads the various thresholds recorded in the memory 4E (step S1 in FIG. 4).

Figure 4:
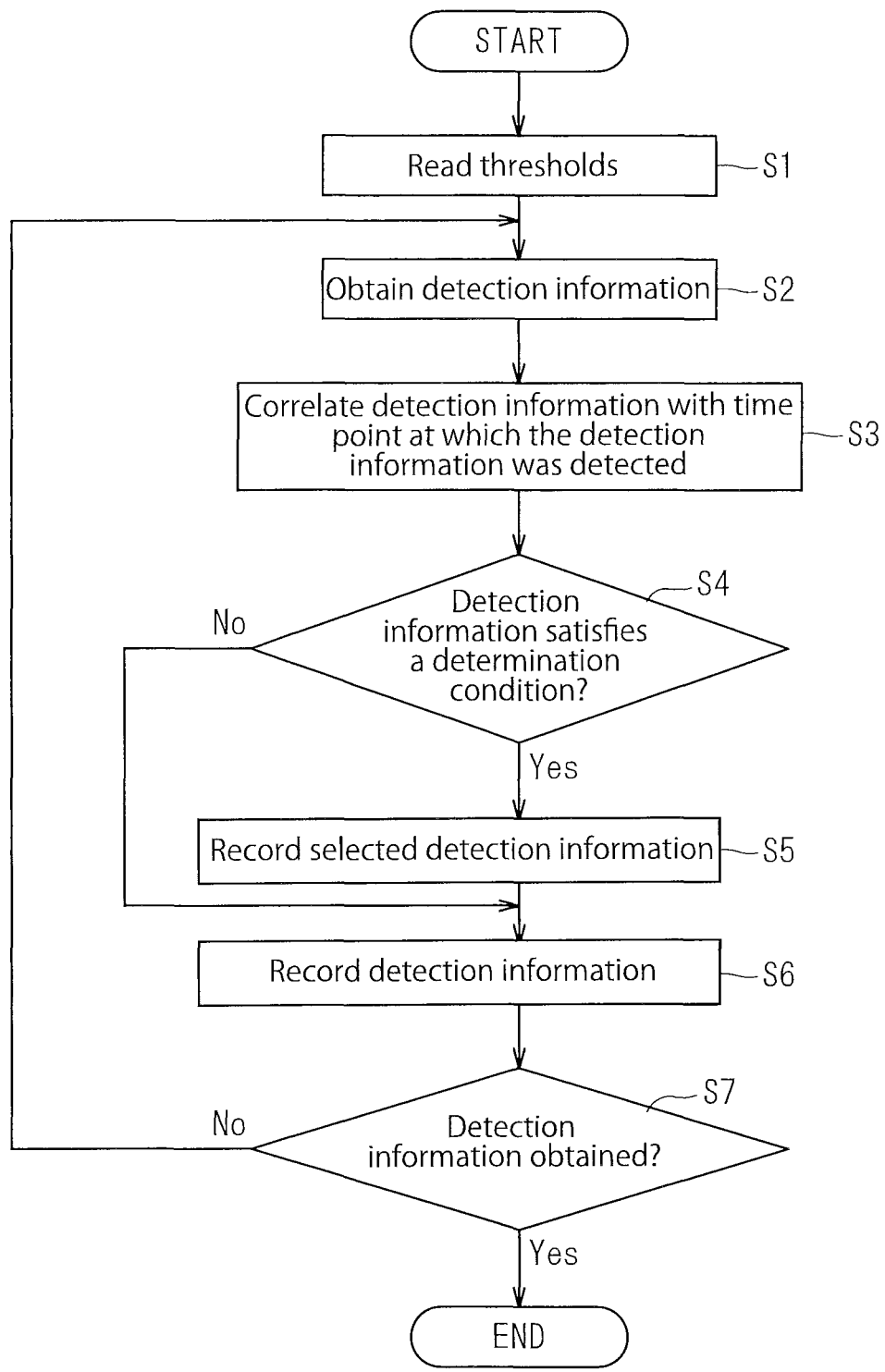
FIG. 4 is a flowchart of a procedure for recording detection information and selected detection information in a memory.

Next, the management apparatus 4 performs processing of obtaining detection information detected at the machine tool 2 and at the NC unit 3 (step S2 in FIG. 4).

Specifically, the control circuit 4C controls the communication unit 4A to make a command to obtain detection information. Then, from the sensor units 21, 22, and 23, the communication unit 4A obtains, as detection information, physical quantities detected by the sensor units 21, 22, and 23 at the detection information obtaining command. The communication unit 4A also obtains, as detection information and from the NC unit 3, alarm information detected by the NC unit 3 at the detection information obtaining command. The communication unit 4A also obtains, as detection information and from the NC unit 3, pieces of machining condition information detected by the NC unit 3 at the detection information obtaining command.

Next, the control circuit 4C prepares detection information D1 made up of components such as the obtained physical quantities, the obtained alarm information, and the obtained pieces of machining condition information (see FIG. 3). Then, the control circuit 4C correlates the detection information D1 with the time point at which the detection information D1 was detected (step S3 in FIG. 4). In this respect, the physical quantity data d1, the alarm information D2, and the pieces of machining condition information d3, which are included in the detection information D1, are detected approximately at the same time points.

Next, the control circuit 4C determines whether the detection information D1 obtained at step S2 is selected detection information that satisfies a predetermined determination condition (step S4 in FIG. 4).

The determination condition includes information for determining, for example, at least one abnormality determination threshold and/or the presence or absence of an alarm. For example, abnormality determination thresholds respectively correspond to the physical quantities included in the detection information.

For example, an abnormality may occur in the machine tool 2 (for example, abnormal vibration detected in the machine tool 2, abnormal load detected in the machine tool 2, abnormal rotational frequency detected in the machine tool 2, abnormal temperature detected while the machine tool 2 is working on machining and while the machine tool 2 is not working on machining, and an occurrence of an alarm). The detection information detected at the time of the abnormality includes data indicating occurrence of the abnormality.

In light of this, in one possible example, the determination condition may be a condition to determine whether the detection information D1 includes data indicating occurrence of an abnormality. In this case, at step S4, the control circuit 4C determines whether the detection information obtained at step S2 is selected detection information that includes data indicating occurrence of an abnormality.

The processing of determining selected detection information at step S4 will be described in detail below using an example.

First, the control circuit 4C compares the physical quantity data d1 included in the detection information D1 with the respective abnormality determination thresholds.

As illustrated in FIG. 3, the detection information D1 includes the plurality of pieces of physical quantity data d1. In light of this, a plurality of abnormality determination thresholds are set in advance in the memory 4E of the management apparatus 4. It is to be noted that the abnormality determination thresholds may be changed to any values by, for example, a user's manipulation of the manipulation section 4D.

In this respect, the physical quantity data d1, which are included in the detection information D1, correspond to the abnormality determination thresholds on a one-to-one basis. In light of this, the control circuit 4C compares a piece of the physical quantity data d1, which are included in the detection information D1, with an abnormality determination threshold that corresponds to the piece of the physical quantity data d1.

The control circuit 4C also determines whether the alarm data d2, which is included in the detection information D1, indicates an occurrence of an alarm in the NC unit 3.

Figure 5:
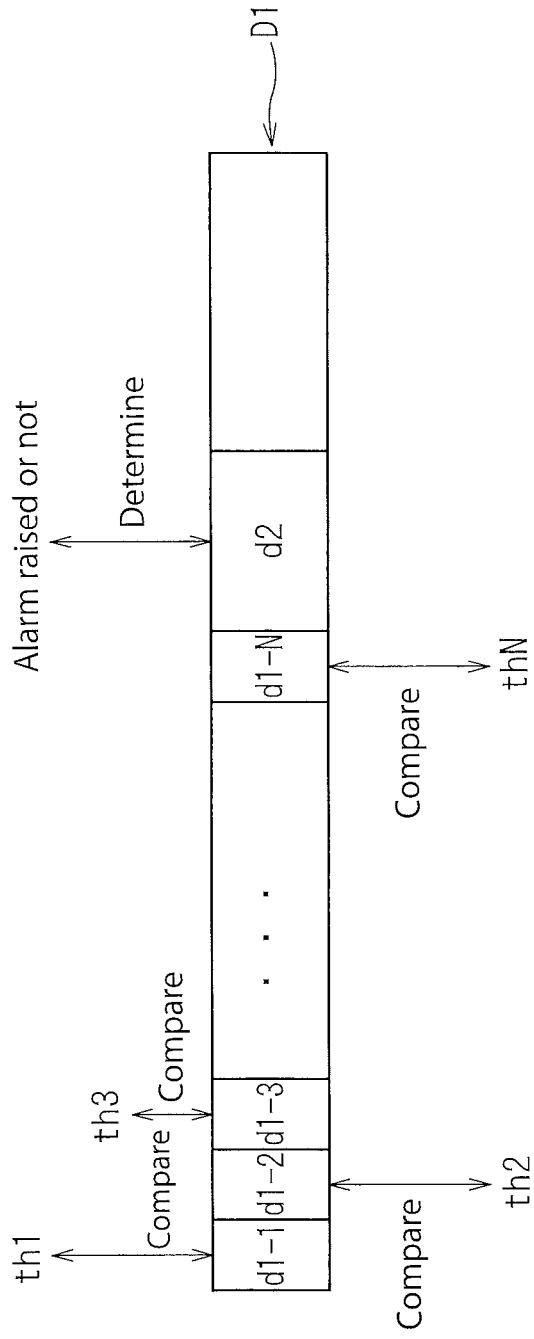
FIG. 5 illustrates an example of how to determine whether detection information satisfies a determination condition.

FIG. 5 illustrates an example concept of the control circuit 4C performing the above-described comparison and determination using the detection information D1 obtained at step S2.

In the example illustrated in FIG. 5, the control circuit 4C compares first physical quantity data d1-1 with a first abnormality determination threshold th1. The control circuit 4C also compares second physical quantity data d1-2 with a second abnormality determination threshold th2. The control circuit 4C also compares third physical quantity data d1-3 with a third abnormality determination threshold th3. The control circuit 4C also compares N-th physical quantity data d1-N with an N-th abnormality determination threshold thN. Further, the control circuit 4C determines whether the alarm data d2 indicates an occurrence of an alarm.

At step S4, the control circuit 4C performs a plurality of times of the above-described comparison processing on the detection information D1 using the abnormality determination thresholds. Assume that as a result of the plurality of times of the comparison processing, the control circuit 4C has detected, in at least one comparison, physical quantity data d1 that is in excess of a corresponding abnormality determination threshold. In this case, the control circuit 4C determines and selects, as selected detection information, detection information D1 including the physical quantity data d1 that is in excess of the corresponding abnormality determination threshold ("Yes" at step S4 in FIG. 4).

Also at step S4, assume that as a result of the determination as to an alarm, the control circuit 4C has determined that the alarm data d2, which is included in the detection information D1, indicates an occurrence of an alarm. In this case, the control circuit 4C determines and selects, as selected detection information, detection information D1 including the alarm data d2 indicating an occurrence of an alarm ("Yes" at step S4 in FIG. 4).

Also at step S4, assume that the control circuit 4C has determined that the detection information D1 obtained at step S2 is selected detection information that satisfies a predetermined determination condition. In this case, the determination at step S4 in FIG. 4 is "Yes", and the procedure proceeds to step S5 in FIG. 4.

At step S5, the control circuit 4C records, in the storage area R2 of the memory 4E, the selected detection information determined and selected at step S4 in relation to the time point at which the selected detection information was detected (that is, together with the time point related at step S3). Then, the procedure proceeds to step S6.

At step S4, assume that the control circuit 4C has determined that the detection information D1 obtained at step S2 does not satisfy a predetermined determination condition. In this case, the determination at step S4 in FIG. 4 is "No", and the procedure proceeds to step S6 in FIG. 4.

Next, at step S6, the control circuit 4C records, in the storage area R1 of the memory 4E, the detection information D1 obtained at step S2 in relation to the time point at which the detection information D1 was detected (that is, together with the time point related at step S3). That is, at step S6, the detection information D1 obtained at step S2 is recorded in the storage area R1 of the memory 4E irrespective of the determination at step S4.

Then, the control circuit 4C determines whether a command to end the detection information obtaining processing has been input into, for example the manipulation section 4D (step S7 in FIG. 4).

When the control circuit 4C has determined that a command to end the detection information obtaining processing has been input, the determination at step S7 in FIG. 4 is "Yes", and the detection information obtaining processing ends.

When the control circuit 4C has determined that no command to end the detection information obtaining processing has been input, the determination at step S7 in FIG. 4 is "No", and the procedure returns to step S2 so that the processing at and after step S2 is performed again immediately or after a predetermined period of time has passed.

The detection information obtaining processing illustrated in FIG. 4 is repeated until an end command is input. It is to be noted that the detection information obtaining processing may be repeated at predetermined time intervals set in advance.

Figure 6:
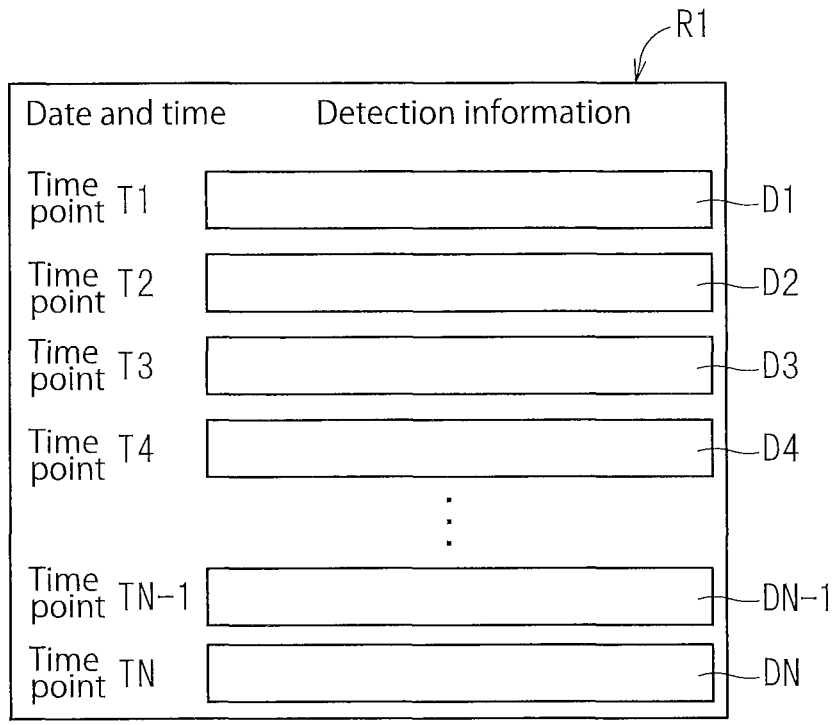
FIG. 6 illustrates an example of detection information recorded in the memory.

FIG. 6 schematically illustrates a plurality of pieces of detection information recorded in the storage area R1 of the memory 4E.

As illustrated in FIG. 6, a plurality of pieces of detection information D1, D2, D3, D4, . . . , DN-1, and DN are recorded in the storage area R1. In the storage area R1, the detection information D1, D2, D3, D4, . . . , DN-1, and DN are recorded respectively in relation to the time points, T1, T2, T3, T4, . . . , TN-1, and TN, at which the detection information D1, D2, D3, D4, . . . , DN-1, and DN were detected. In the example illustrated in FIG. 6, the detection information D1 is recorded in the storage area R1 in relation to the time point T1. The detection information D2 is recorded in the storage area R1 in relation to time point T2. The detection information DN is recorded in the storage area R1 in relation to time point TN.

It is to be noted that each of the time points T1, T2, T3, T4, . . . , TN-1, and TN is information made up of, for example, date and time. For example, assume that the detection information D1 was detected at 12 (hour): 30 (minute): 10 (second) on Apr. 20, 2017. In this case, the information of the time point T1, which is related to the detection information D1, indicates 12 (hour): 30 (minute): 10 (second) on Apr. 20, 2017.

When the detection information D1, D2, D3, D4, . . . , DN-1, and DN are recorded in the memory 4E, the control circuit 4C aligns the detection information D1, D2, D3, D4, . . . , DN-1, and DN based on the time points T1, T2, T3, T4, . . . , TN-1, and TN (that is, in the order: T1, T2, T3, T4, . . . , TN-1, and TN). In this case, in the example illustrated in FIG. 6, the detection information D2 is information detected after the detection information D1 was detected. The detection information D3 is information detected after the detection information D2 was detected. The detection information DN is information detected after the detection information DN-1 was detected.

Figure 7:
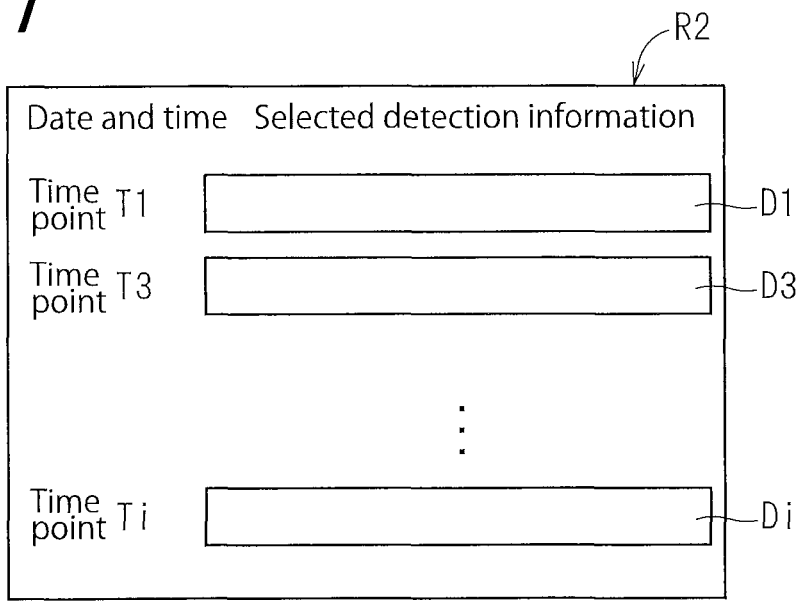
FIG. 7 illustrates an example of selected detection information recorded in the memory.

FIG. 7 schematically illustrates a plurality of pieces of selected detection information recorded in the storage area R2 of the memory 4E.

In the example illustrated in FIG. 7, detection information D1, D3, . . . , Di are determined and selected as selected detection information from among the plurality of pieces of detection information D1, D2, D3, D4, . . . , DN-1, and DN illustrated in FIG. 6, and recorded in the storage area R2. Also as illustrated in FIG. 7, the selected detection information D1, D3, . . . , Di are stored in the storage area R2 in the memory 4E respectively in relation to the time points, T1, T3, . . . , Ti, at which the selected detection information D1, D3, . . . , Di were detected.

It is to be noted that the control circuit 4C aligns the plurality of pieces of selected detection information D1, D3, . . . , Di in the storage area R2 of the memory 4E based on time points respectively related to the selected detection information D1, D3, . . . , Di (that is, in relation to the time points at which the selected detection information were detected). That is, the plurality of pieces of selected detection information D1, D3, . . . , Di are aligned on a detection-time-series basis based on the time points T1, T3, . . . , Ti.

Next, the control circuit 4C displays a predetermined image on the display 4B using the data recorded in the storage area R2 of the memory 4E. This operation will be described in detail using the flowchart illustrated in FIG. 8.

The control circuit 4C reads data browsing software stored in the memory 4E. Then, the control circuit 4C performs control based on the data browsing software (see START in FIG. 8).

Figure 8:
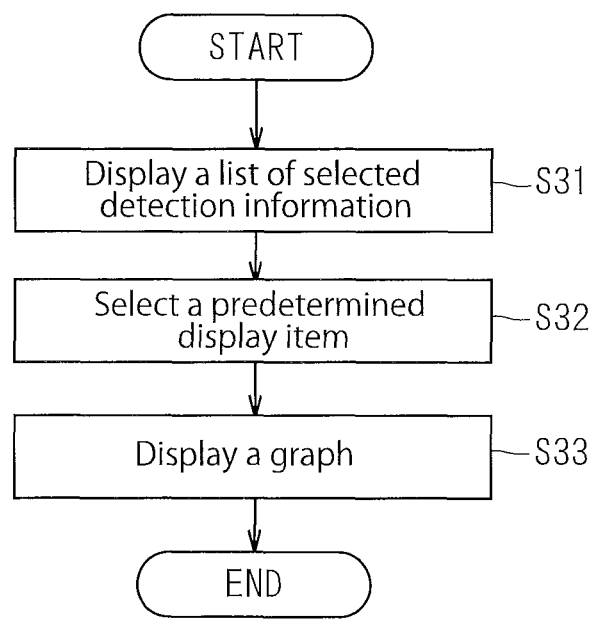
FIG. 8 is a flowchart of a procedure for displaying a graph using selected detection information.

The control circuit 4C displays, on the display 4B, the plurality of pieces of selected detection information stored in the storage area R2 (step S31 in FIG. 8).

On the display 4B, the selected detection information are displayed in the form of a list using predetermined display items identifying the selected detection information. As example predetermined display items, it is possible to use time points related to each piece of the selected detection information.

Figure 9:
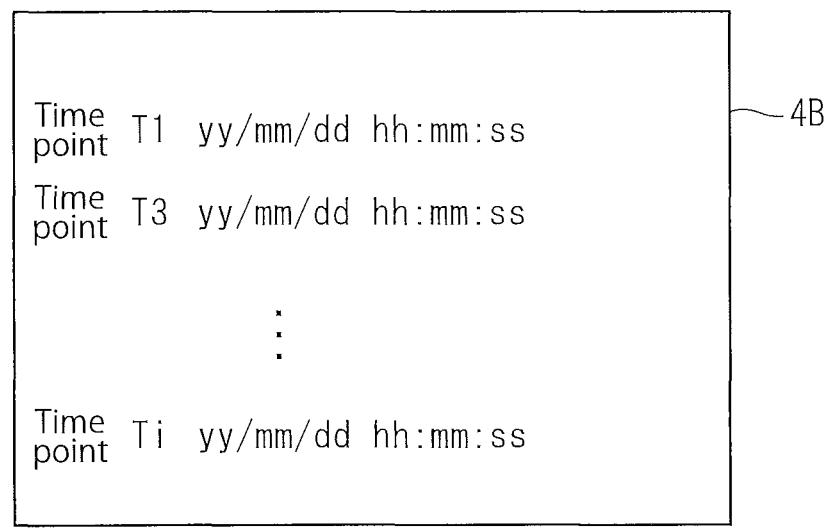
FIG. 9 illustrates an example content displayed on a display.

FIG. 9 illustrates the display 4B displaying, using predetermined display items, the plurality of pieces of selected detection information D1, D3, ..., Di illustrated in FIG. 7. In FIG. 9, the predetermined display items are the time points T1, T3, ..., Ti, which are respectively related to the selected detection information. The time points T1, T3, ..., Ti are displayed in the form of: "Year/Month/Date Time/Minute/Second".

When the content illustrated in FIG. 9 is displayed on the display 4B, the time point T1 indicates the selected detection information D1, the time point T3 indicates the selected detection information D3, and the time point Ti indicates the selected detection information Di.

Thus, in the display example illustrated in FIG. 9, the time point T1, which is a predetermined display item, is linked to the selected detection information D1, which is stored in the storage area R2. The time point T3, which is a predetermined display item, is linked to the selected detection information D3, which is stored in the storage area R2. The time point Ti, which is a predetermined display item, is linked to the selected detection information Di, which is stored in the storage area R2.

In FIG. 9, the predetermined display items are aligned in time-series order on the display 4B based on the time points T1, T3, ..., Ti. When there are a large number of predetermined display items, a limited number of these predetermined display items are displayed on the screen. Thus, at least some of the predetermined display items are displayed on the display 4B. The other predetermined display items may be made viewable on the display 4B using a scroll bar or a similar function.

Next, one predetermined display item is selected from among the plurality of predetermined display items displayed in the form of a list on the display 4B (step S32 in FIG. 8). In the following description, the operation at step S32 will be detailed.

For example, assume that the content illustrated in FIG. 9 is displayed on the display 4B. At the manipulation section 4D, a user selects the time point T3 as a predetermined display item. Then, assume that the user manipulates the manipulation section 4D to make a "display in a graph" instruction. In this case, the control circuit 4C recognizes that the manipulation section 4D has received the above-described selection and manipulation. Then, the control circuit 4C performs a next operation.

The control circuit 4C extracts next detection information from among the plurality of pieces of detection information D1, D2, D3, D4, ..., DN-1, and DN, which are stored in the storage area R1 of the memory 4E. That is, the control circuit 4C extracts, from the memory 4E, a plurality of pieces of detection information including the selected detection information D3, which corresponds to the selected one predetermined display item (time point T3).

The extracted plurality of pieces of detection information are detection information detected within a predetermined period of time including the selected time point T3. The range of the predetermined period of time may be freely changed by a user. Also, the time-series position of the selected time point T3 in the predetermined period of time may be set at any desired position. For example, it is possible to position the selected time point T3 at the center of the predetermined period of time.

Next, using the data included in the extracted plurality of pieces of detection information, the control circuit 4C makes a graph of a change over time of the data. Then, the control circuit 4C displays the graph that has been made on the display 4B (step S33 in FIG. 8).

Figure 10:
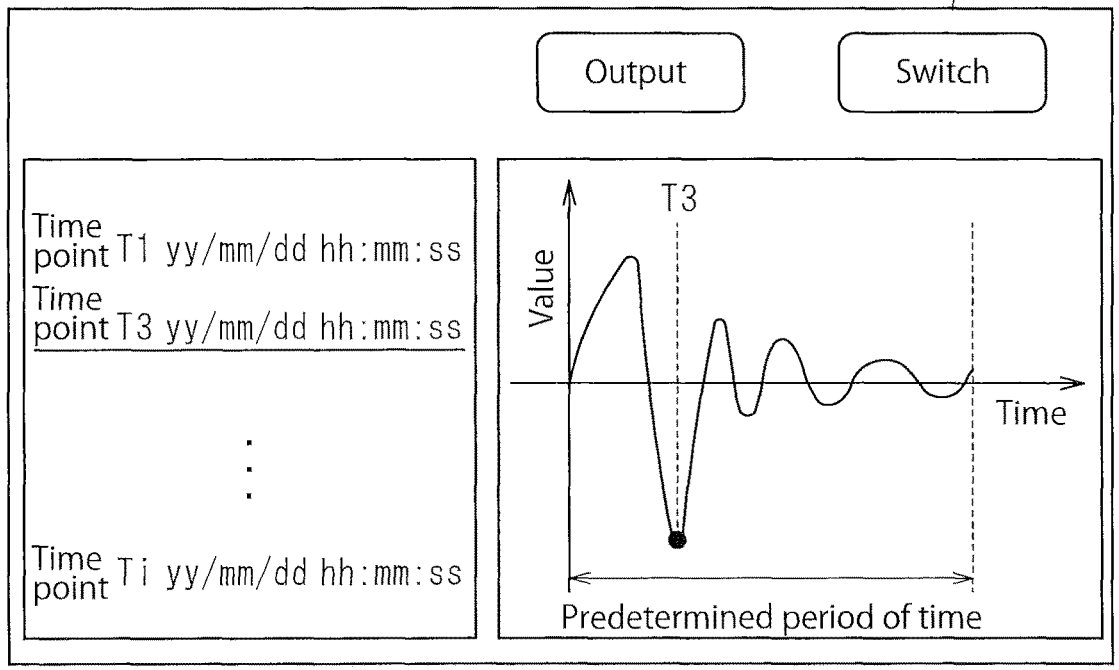
FIG. 10 illustrates another example content displayed on the display.

FIG. 10 illustrates an example graph displayed on the display 4B.

In the example of FIG. 10, the graph that has been made and the plurality of predetermined display items illustrated in FIG. 9 (the time points T1, T3, ..., Ti) are displayed side by side on the display 4B.

As described above, when the time point T3 is selected, a plurality of pieces of detection information detected within a predetermined period of time including the time point T3 are extracted from the memory 4E and displayed in a graph. In the example of FIG. 10, a graph is made using the pieces of physical quantity data d1, which are included in the extracted detection information and indicate acceleration of vibration occurring in the tool spindle 2a1. In other words, in FIG. 10, the display 4B displays a graph of a change over time of the acceleration of vibration that is occurring in the tool spindle 2a1 and that is detected within a predetermined period of time including the time point T3.

The type of the graph displayed on the display 4B may be freely set by a user. As described above, each piece of detection information includes a plurality of pieces of physical quantity data d1. A user may select which physical quantity data d1 of the plurality of pieces of physical quantity data d1 to use to make a graph of a change over time of the physical quantity data d1.

As described above, by manipulating the manipulation section 4D, a user selects a display item (time point T3) from among the plurality of predetermined display items. That is, from among the plurality of pieces of selected detection information D1, D3, ..., Di, a user selects the selected detection information D3, which corresponds to the time point T3. Then, as illustrated in, for example, FIG. 10, the control circuit 4C displays, in a visually recognizable manner in a graph, the position of the data (referred to as selected data) included in the selected detection information D3 selected by the user.

In other words, the control circuit 4C emphasizes the position corresponding to the selected data in the graph displayed on the display 4B so as to distinguish the position corresponding to the selected data from other positions (positions of data other than the selected data) in the graph. In the example of FIG. 10, the position corresponding to the selected data is displayed with a black filled circle in the graph.

It is to be noted that in the example of FIG. 10, the predetermined period of time is set so that the selected time point T3 is at a position other than the center of the predetermined period of time.

The operation illustrated in FIG. 8 of displaying a graph has been described above. The management apparatus 4 is also capable of making the following display.

Assume that a user manipulates the manipulation section 4D to make a "graph switching" instruction. For example, as illustrated in FIG. 10, the "Switch" icon, which indicates graph switching, is displayed on the display 4B. The user manipulates the manipulation section 4D to click on the "Switch" icon. In this case, the control circuit 4C recognizes that the manipulation section 4D has received the manipulation. Then, the control circuit 4C displays a plurality of kinds of graphs on the display 4B.

Figure 11:
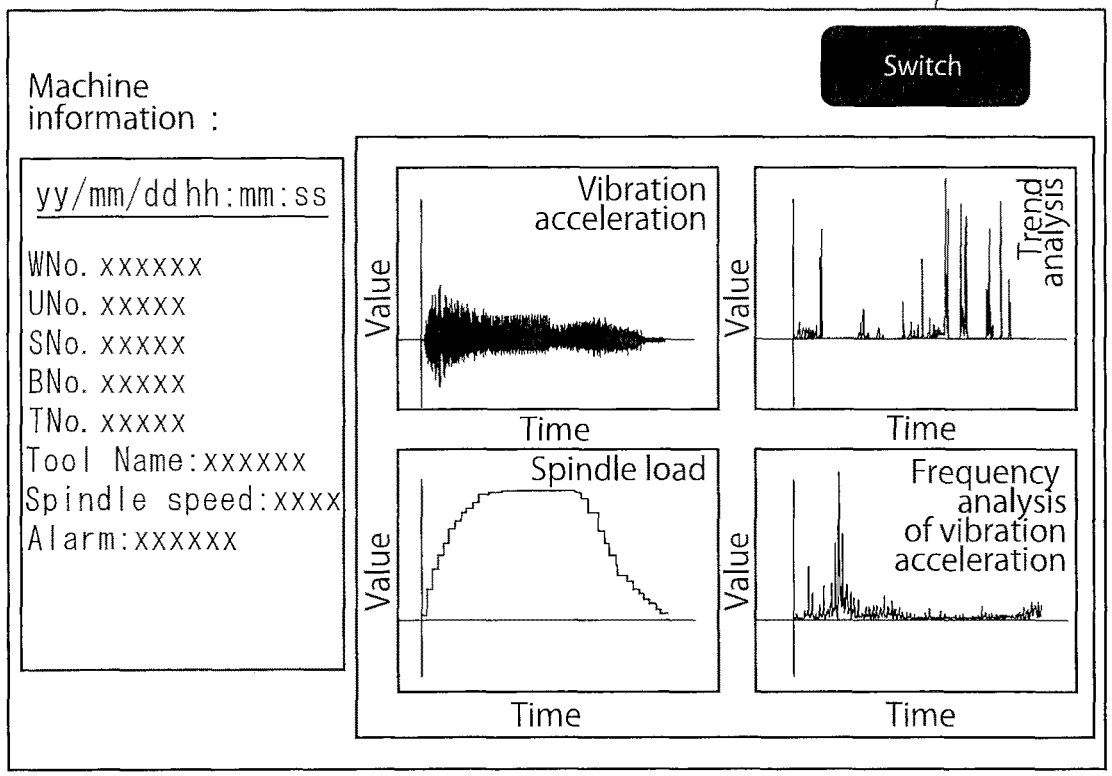
FIG. 11 illustrates another example content displayed on the display.

FIG. 11 illustrates an example content displayed after graph switching.

As described above, for example, when the time point T3 is selected, a plurality of pieces of detection information detected within a predetermined period of time including the time point T3 are extracted from the memory 4E and displayed in a graph. As illustrated in FIG. 11, which illustrates an example content displayed after graph switching processing, a plurality of graphs are made using some pieces of the physical quantity data d1 included in the extracted detection information. That is, in FIG. 11, the display 4B displays graphs of changes over time of some physical quantities detected within the predetermined period of time including the time point T3 (examples of the physical quantities include various accelerations, tool-side spindle load, and waveforms obtained using a plurality of physical quantities).

Displaying a plurality of graphs enables time-series changes of a plurality of physical quantities to be checked simultaneously, facilitating identification of what causes a machining failure. Also in FIG. 10, a graph of a change over time of vibration acceleration is displayed on the display 4B. As illustrated in FIG. 11, changes over time of other physical quantities are displayed as well. This facilitates identification of what causes a machining failure even when the cause is other than, for example, vibration.

Also in FIG. 11, machine information are displayed on the display 4B in a visually recognizable manner. The machine information include: the information (date and time) of the selected time point T3; and a plurality of data included in the detection information D3, which is related to the time point T3 (for example, at least part of the machining condition data d3, which is included in the detection information D3).

For further example, as illustrated in FIG. 10, the "Output" icon is displayed on the display 4B. A user manipulates the manipulation section 4D to click on the "Output" icon. In this case, the control circuit 4C recognizes that the manipulation section 4D has received the manipulation. Then, the control circuit 4C makes a tabular format file using a plurality of pieces of data, and stores the file in the memory 4E. In this respect, the data constituting the tabular format file are data included in a plurality of pieces of detection information detected within a predetermined period of time including the time point T3. The tabular format file may be displayed on the display 4B.

FIG. 12 illustrates an example of how the tabular format file is displayed on the display 4B.

As described above, for example, when the time point T3 is selected, a plurality of pieces of detection information detected within a predetermined period of time including the time point T3 are extracted from the memory 4E and displayed in a graph. As illustrated in FIG. 12, which illustrates an example tabular format that has been output, a table is made using a plurality of pieces of physical quantity data d1-1 to d1-N, which are included in the extracted detection information. That is, in FIG. 12, changes over time of a plurality of physical quantities detected within the predetermined period of time including the time point T3 are quantified on the display 4B in the form of a table.

It is also possible to take a tabular format file out of the memory 4E and display the table illustrated in FIG. 12 on the monitor of a PC or a similar device other than the management apparatus 4.

Assume that with the content illustrated in FIG. 10 displayed on the display 4B, a user manipulates the manipulation section 4D to select a predetermined position in the displayed graph. For example, as illustrated in FIG. 13, a graph is displayed on the display 4B, and the user manipulates the manipulation section 4D to select a predetermined position (position indicated by the arrow) in the graph.

In this case, the control circuit 4C recognizes that the manipulation section 4D has received the manipulation. Then, the control circuit 4C displays, on the display 4B, data included in detection information (hereinafter referred to as point detection information) corresponding to the selected predetermined position.

Figure 14:
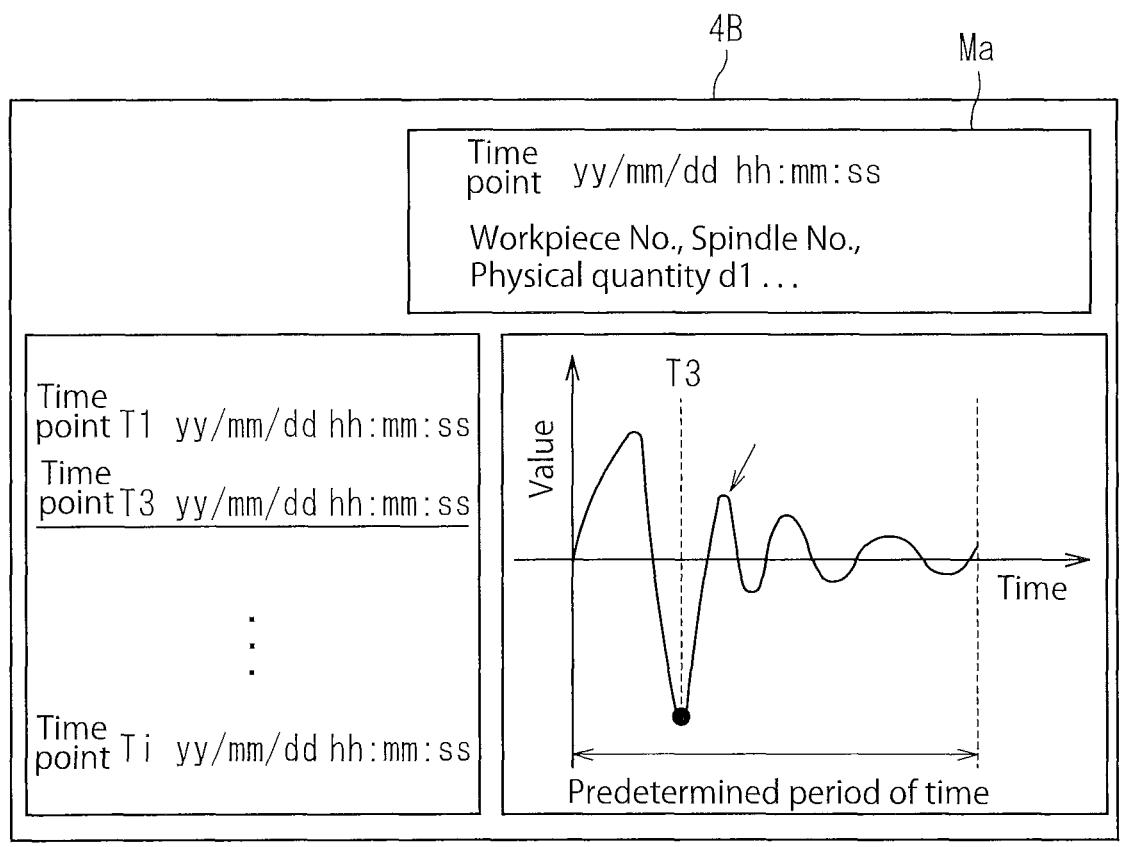
FIG. 14 illustrates another example content displayed on the display.

FIG. 14 illustrates an example content displayed after a predetermined position has been selected in the graph.

As described above, for example, when the time point T3 is selected, a plurality of pieces of detection information detected within a predetermined period of time including the time point T3 are extracted from the memory 4E and displayed in a graph. As illustrated in FIG. 14, which illustrates an example content displayed after a predetermined position has been selected in the graph, the display 4B displays data Ma. The data Ma is included in the point detection information. In the display content illustrated in FIG. 14, the display content illustrated in FIG. 10 is included.

In the example of FIG. 14, examples of displayed items of the data Ma include: some pieces of the physical quantity data d1 included in the point detection information; and the machining condition data d3 included in the point detection information (for example, workpiece identification number and spindle identification number, which are part of the machining condition data d3). It is to be noted that a user may freely determine which data of the plurality of pieces of data included in the point detection information to display as the data Ma.

Displaying the data Ma together with the graph ensures that information that a user needs is displayed on the display 4B. This facilitates identification of what causes a machining failure.

Figure 15:
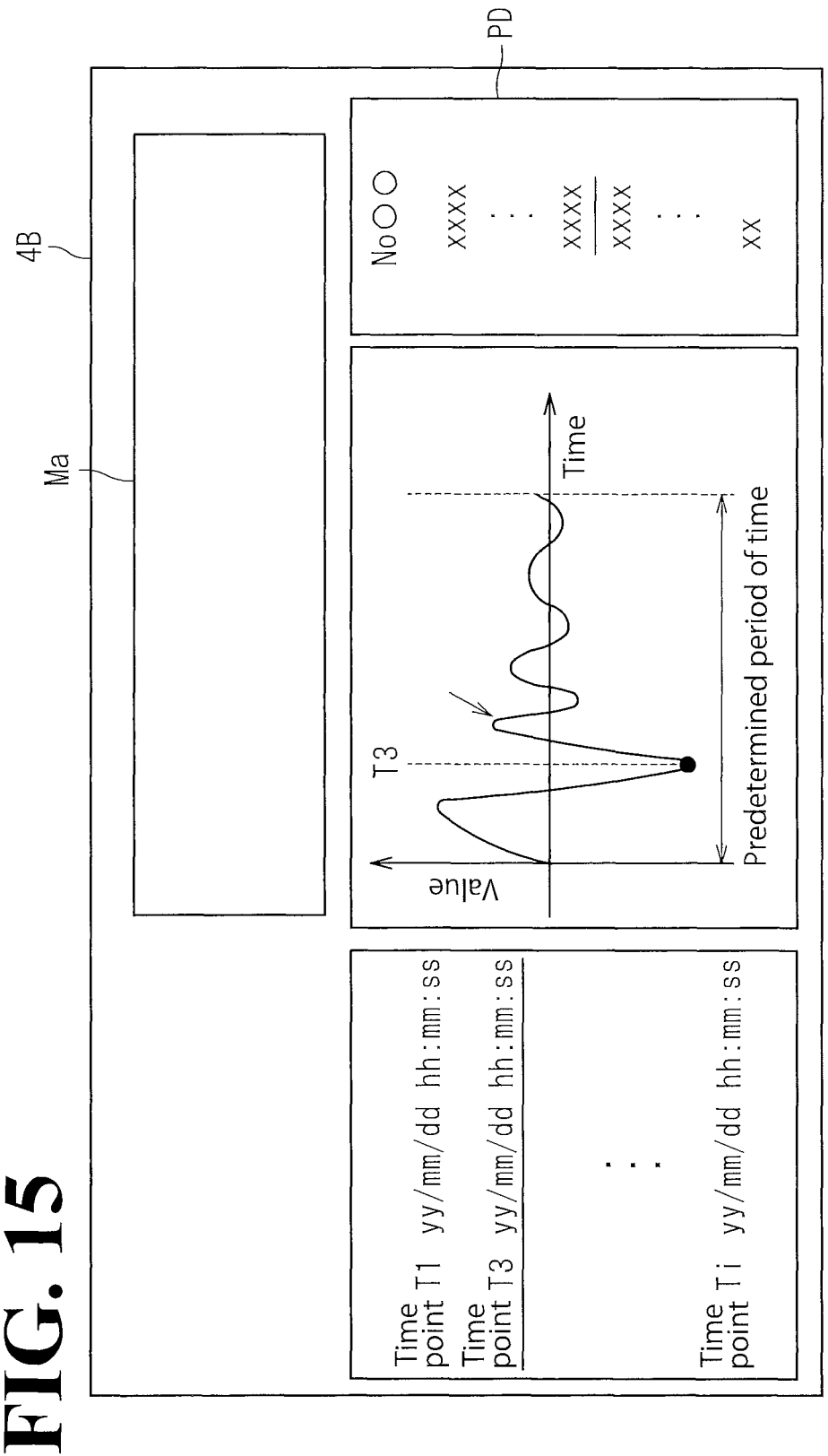
FIG. 15 illustrates another example content displayed on the display.

FIG. 15 illustrates another example content displayed after a predetermined position has been selected in the graph.

In FIG. 15, data Ma (identical to the data Ma illustrated in FIG. 14), which is included in the point detection information, is displayed on the display 4B. Additionally, a content of a machining program PD, which is included in the machining condition data d3 of the point detection information, is displayed on the display 4B. In FIG. 15, details of the data Ma are omitted. In the display content illustrated in FIG. 15, the display content illustrated in FIG. 10 is included.

It is possible to emphasize in the machining program PD the position of the machining program executed at the time point at which the point detection information was detected (see the underlined portion of the machining program PD in FIG. 15).

Thus, the machine tool management system 100 according to this embodiment includes the machine tool 2, the memory 4E, and the control circuit 4C. The control circuit 4C determines whether detection information is selected detection information that satisfies a predetermined determination condition. Also, the control circuit 4C records, in the memory 4E, a plurality of pieces of selected detection information respectively in relation to the time points at which the plurality of pieces of selected detection information were detected.

This configuration ensures that from a large number of pieces of detection information, a plurality of pieces of selected detection information that satisfy a determination condition are automatically extracted. This configuration saves users labor in that it is not necessary for users themselves to, for example, make search to extract detection information that includes data suspected as abnormal from a large number of pieces of detection information. This, as a result, facilitates identification of what causes a machining failure.

It is to be noted that the conditions of machining using the machine tool 2 vary due to, for example, change of the machining environment, wear of the tool 15, and change of the machining program. This can cause chatter vibration, tool damage, and/or other occurrences, resulting in a machining failure.

In the machine tool management system 100 according to this embodiment, the control circuit 4C aligns the plurality of pieces of selected detection information based on time points respectively related to the plurality of pieces of selected detection information. For example, as described above, the selected detection information are aligned in the memory 4E in time-series order based on the time points.

Thus, the plurality of pieces of selected detection information are aligned in time-series order in the memory 4E. This enables users to easily recognize the time at which a plurality of pieces of selected detection information that satisfy a search condition were detected.

The machine tool management system 100 according to this embodiment also includes the sensor units 21, 22, and 23. The detection information includes physical quantities (such as vibration value, load, the rotational frequency, and temperature) detected by the sensor units 21, 22, and 23. The control circuit 4C compares a physical quantity (quantities) included in the detection information with an abnormality determination threshold(s). Then, the control circuit 4C selects, as selected detection information, detection information that includes a physical quantity in excess of the corresponding abnormality determination threshold.

This configuration ensures that from a large number of pieces of detection information, detection information including a physical quantity that can be determined as abnormal is automatically extracted as selected detection information. This configuration saves users the labor of making search to extract, from a large number of pieces of detection information, detection information including a physical quantity that has been detected by the sensor units 21, 22, and 23 and that has an abnormal value.

The machine tool management system 100 according to this embodiment also includes an alarm raiser (the NC unit 3) that raises an alarm. The detection information includes alarm information associated with the alarm detected by the NC unit 3. The control circuit 4C selects, as selected detection information, detection information that includes alarm information indicating an occurrence of an alarm.

This configuration ensures that from a large number of pieces of detection information, detection information detected at the time point at which the NC unit 3 raised the alarm is automatically extracted as selected detection information. This configuration saves users the labor of making search to extract, from a large number of pieces of detection information, detection information detected at the time point at which an alarm was raised because of some abnormality.

The machine tool management system 100 according to this embodiment also includes the display 4B. The display 4B displays a list of at least some pieces of the plurality of pieces of selected detection information using predetermined display items (for example, time points each made up of date and time).

This configuration enables users to easily visually recognize extracted selected detection information (for example, detection information detected at the time point at which an abnormality occurred). Each piece of the selected detection information is displayed on the display 4B using a time point. This configuration ensures that the time at which, for example, what causes a machining failure occurred is easily identified from the displayed list.

Assume that one predetermined display item has been selected from among the plurality of predetermined display items displayed in the form of a list on the display 4B. In this case, the control circuit 4C according to this embodiment extracts, from the memory 4E, a plurality of pieces of detection information including selected detection information corresponding to the selected one predetermined display item. Then, using the data included in the extracted plurality of pieces of detection information, the control circuit 4C makes a graph of a change over time of the data. Then, the control circuit 4C displays the graph on the display 4B.

This configuration enables users to easily analyze the displayed graph on the display 4B. This configuration enables users to easily identify, for example, what causes a machining failure.

Also in the machine tool management system 100 according to this embodiment, in the graph, the control circuit 4C displays the position corresponding to the data included in the selected detection information so that the position is distinguished from other positions.

This configuration enables users to easily recognize, in the displayed graph, the time point of selected detection information including abnormal data. This configuration enables users to quickly identify a cause of an abnormality.

Assume that a predetermined position has been selected in the displayed graph. In this case, the control circuit 4C according to this embodiment displays, on the display 4B, data included in the detection information corresponding to the selected predetermined position.

This configuration improves the convenience with which the displayed graph is analyzed, and promotes users' analysis for a cause of an abnormality.

Embodiment 2

In embodiment 1, the control circuit 4C stores a plurality of pieces of detection information in the storage area R1 of the memory 4E (see FIG. 6). In contrast, the control circuit 4C determines, as selected detection information, detection information that satisfies a determination condition, and the control circuit 4C stores a plurality of pieces of selected detection information in the storage area R2 of the memory 4E (see FIG. 7). The plurality of pieces of selected detection information stored in the storage area R2 are listed using predetermined display items (see FIG. 9). Also as described above, a graph is displayed on the display 4B (see, for example, FIG. 10).

In this embodiment, selected detection information that satisfies a search condition (this selected detection information will be hereinafter referred to as search selected detection information) is selected from among a plurality of pieces of selected detection information.

Examples of the search condition that can be used include machining-program identification information, alarm identification information, tool identification information, and workpiece identification information.

The machine tool management system according to embodiment 2 has approximately the same configuration as the configuration of the machine tool management system 100 according to embodiment 1 illustrated in FIGS. 1 and 2. In light of this, description of the configuration of the machine tool management system according to embodiment 2 will be omitted here. In the following description, an operation of the machine tool management system according to embodiment 2 will be described in detail using the schematic configurations illustrated in FIGS. 1 and 2.

Figure 16:
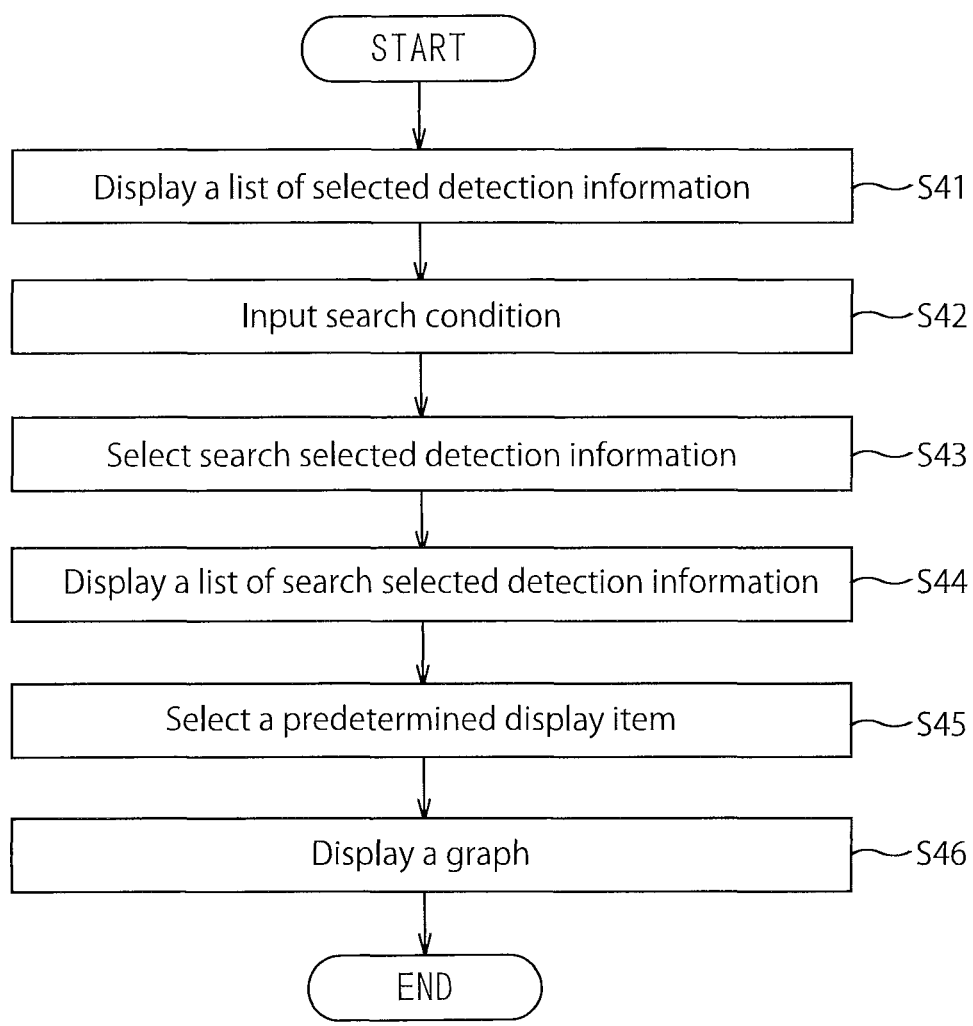
FIG. 16 is a flowchart of a procedure for displaying a graph using search selected detection information.

FIG. 16 is a flowchart of an operation of the machine tool management system according to embodiment 2.

Referring to FIG. 2, the control circuit 4C reads data browsing software stored in the memory 4E. Then, the control circuit 4C performs control based on the data browsing software (see START in FIG. 16).

As described in embodiment 1, a plurality of pieces of selected detection information are displayed in the form of a list on the display 4B using predetermined display items (step S41 in FIG. 16). The procedure for displaying the plurality of pieces of selected detection information are approximately the same as step S31 in FIG. 8.

Figure 17:
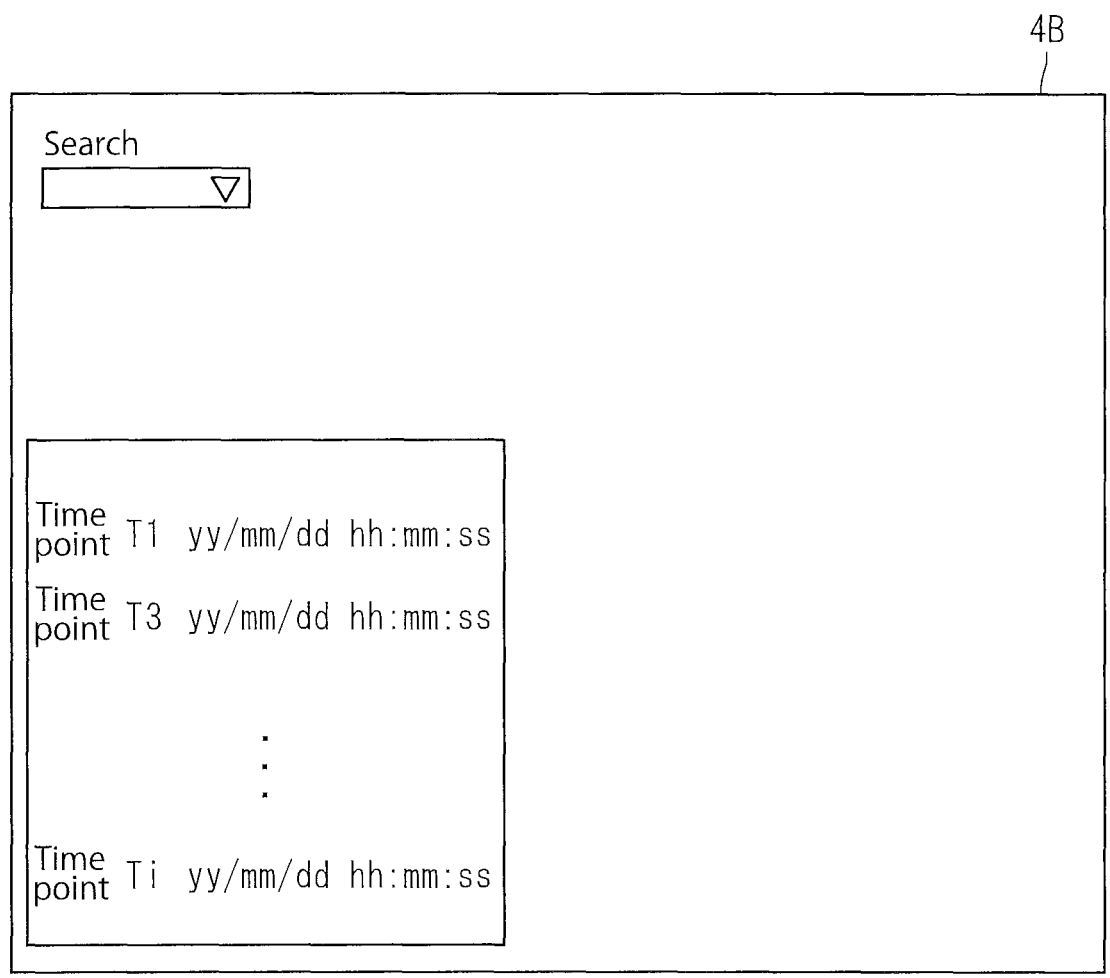
FIG. 17 illustrates another example content displayed on the display.

FIG. 17 illustrates a content displayed on the display 4B after step S41. Referring to FIG. 17, predetermined display items indicating selected detection information are displayed on the display 4B, similarly to FIG. 9. It is noted, however, that in this embodiment, a "Search" window, in which to input a search condition, is displayed on the display 4B, as illustrated in FIG. 17.

As illustrated in FIG. 17, with the "Search" window displayed on the display 4B, a user manipulates the manipulation section 4D to input a search condition in the "Search" window (step S42 in FIG. 16). It is possible to attach a pull-down mark (∇) to the "Search" window so that one of search conditions set in advance is selected from the pull-down menu and input as a search condition. Upon input of the search condition, the control circuit 4C recognizes that the manipulation section 4D has received the search condition. Then, the control circuit 4C performs a next operation.

As mentioned in the description regarding steps S4 and 5 in FIG. 4, the plurality of pieces of selected detection information D1, D3, . . . , Di are selected and stored in the memory 4E. In light of this, the control circuit 4C determines whether the selected detection information D1, D3, . . . , Di, which are stored in the memory 4E, include data that satisfy the input search condition.

The control circuit 4C makes this determination for each of the plurality of pieces of selected detection information D1, D3, . . . , Di, which are stored in the memory 4E. Then, from among the plurality of pieces of selected detection information D1, D3, . . . , Di, the control circuit 4C selects, as search selected detection information, selected detection information including data that satisfies the input search condition (step S43 in FIG. 16).

For example, assume that a search condition indicating a desired machining program has been input in the "Search" window. In this case, the control circuit 4C refers to the machining condition data d3 of each of the selected detection information D1, D3, . . . , Di, which are stored in the storage area R2. Then, the control circuit 4C determines whether the machining condition data d3 includes identification data indicating the desired machining program.

Then, assume that the control circuit 4C has detected, from a piece of selected detection information, machining condition data d3 including identification data indicating the desired machining program. In this case, from among the plurality of pieces of selected detection information D1, D3, . . . , Di, the control circuit 4C selects, as search selected detection information, selected detection information including the detected machining condition data d3.

It is to be noted that the search condition may be other than machining-program identification information, other examples including alarm identification information, tool identification information, and workpiece identification information.

For example, assume that a tool identification number has been input as a search condition. In this case, from among the plurality of pieces of selected detection information D1, D3, . . . , Di, the control circuit 4C selects, as search selected detection information, selected detection information including the tool identification number.

Also assume that an alarm identification number has been input as a search condition. In this case, from among the plurality of pieces of selected detection information D1, D3, . . . , Di, the control circuit 4C selects, as search selected detection information, selected detection information including the alarm identification number.

Also assume that a workpiece identification number has been input as a search condition. In this case, from among the plurality of pieces of selected detection information D1, D3, . . . , Di, the control circuit 4C selects, as search selected detection information, selected detection information including the workpiece identification number.

Next, the control circuit 4C records the search selected detection information that has been selected in, for example, the storage area R2 of the memory 4E in relation to the time point at which the search selected detection information was detected. In this case, the search selected detection information is recorded in a section of the storage area R2 different from the section in which the plurality of pieces of selected detection information D1, D3, . . . , Di are recorded.

In this respect, when at step S43 a plurality of pieces of search selected detection information have been selected, the control circuit 4C aligns the plurality of pieces of search selected detection information in the storage area R2 in time-series order based on time points respectively related to the plurality of pieces of search selected detection information.

Then, the control circuit 4C controls the display 4B to display the search selected detection information that has been selected on the display 4B using a predetermined display item (such as time point) (step S44 in FIG. 16).

In this respect, when at step S43 a plurality of pieces of search selected detection information have been selected, the control circuit 4C displays a list of the selected plurality of pieces of search selected detection information on the display 4B using predetermined display items (such as time point).

FIG. 18 illustrates an example of how a plurality of pieces of search selected detection information are displayed on the display 4B using predetermined display items (time points respectively related to the search selected detection information).

As illustrated in FIG. 18, in the "Search result" window of the display 4B, predetermined display items (time points) respectively corresponding to the plurality of pieces of search selected detection information are aligned in time-series order based on the time points. In the "Selected detection information" window of the display 4B, predetermined display items (time points) respectively corresponding to the plurality of pieces of selected detection information are aligned in time-series order based on the time points.

As seen from the above description, the search selected detection information, which are stored in the storage area R2, are results of narrowing down, using a search condition, the plurality of pieces of selected detection information D1, D3, . . . , Di, which are stored in the storage area R2. Similarly, the predetermined display items displayed in the "Search result" window are results of narrowing down, using a search condition, the plurality of predetermined display items displayed in the "Selected detection information" window.

As illustrated in FIG. 18, in the "Search result" window of the display 4B, a plurality of predetermined display items are displayed in the form of a list. With this display state, one predetermined display item is selected from among the plurality of predetermined display items (step S45 in FIG. 16). In FIG. 18, time point T3 is selected. Upon selection of the one predetermined display item, the control circuit 4C displays the one predetermined display item in a graph, as described in embodiment 1 as well.

That is, the control circuit 4C extracts, from among the plurality of pieces of detection information stored in the storage area R1 of the memory 4E, a plurality of pieces of detection information including search selected detection information corresponding to the selected one predetermined display item (time point). The extracted plurality of pieces of detection information are detection information detected within a predetermined period of time including the selected time point.

Then, using the data included in the extracted plurality of pieces of detection information, the control circuit 4C makes a graph of a change over time of the data. The detection information includes a plurality of data.

For example, assume that there is a need for displaying a graph of a change over time of vibration acceleration of the tool spindle 2*a*1. In this case, the control circuit 4C extracts, from each piece of the detection information, physical quantity data d1 that indicates a value of "vibration acceleration of the tool spindle 2*a*1". Then, the control circuit 4C makes a graph of a change over time using the extracted pieces of physical quantity data d1 that indicate values of "vibration acceleration of the tool spindle 2*a*1".

Then, the control circuit 4C displays the graph that has been made on the display 4B (step S46 in FIG. 16).

Figure 19:
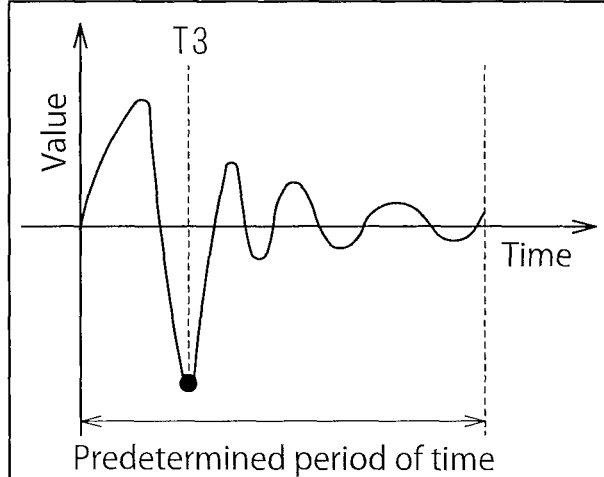
FIG. 19 illustrates another example content displayed on the display.

FIG. 19 illustrates the graph that has been made displayed on the display 4B in addition to the display content illustrated in FIG. 18.

As described in embodiment 1 as well, the control circuit 4C may emphasize the position of the data included in the search selected detection information selected by the user using the graph displayed on the display 4B so that the position is distinguished from other positions. In the example of FIG. 19, similarly to embodiment 1, a black filled circle is used in the graph to emphasize the position of the data included in the search selected detection information selected by the user.

The operation illustrated in FIG. 16 of displaying a graph has been described above. The management apparatus 4 is also capable of making the following display.

As described in embodiment 1, a user may manipulate the manipulation section 4D to make a "graph switching" instruction. In this case, the control circuit 4C displays a plurality of kinds of graphs on the display 4B using the data included in a plurality of pieces of detection information including the search selected detection information that has been selected. As seen from the above description, the plurality of pieces of detection information are detection information detected within the predetermined period of time including the time point related to the search detection information that has been selected.

As described above, the search selected detection information is a result of narrowing down, using a search condition, the plurality of pieces of selected detection information. In light of this, examples of how the plurality of kinds of graphs are displayed can be understood by referring to FIG. 11, described above. It is to be noted that the number and type of graphs to be displayed may be freely determined by a user.

As described in embodiment 1, a user may manipulate the manipulation section 4D to click on the "Output" icon. In this case, as described in embodiment 1 as well, the control circuit 4C makes a tabular format file using predetermined data, and stores the tabular format file in the memory 4E. It is also possible to display the tabular format file in the form of a table on the display 4B or another monitor.

As described above, the search selected detection information is a result of narrowing down, using a search condition, the plurality of pieces of selected detection information. In light of this, an example of how the table is displayed can be understood by referring to FIG. 12, described above. As described in embodiment 1, the table is made using the data included in the plurality of pieces of detection information detected within the predetermined period of time (including the search selected detection information that has been selected).

As described in embodiment 1, a user may manipulate the manipulation section 4D to select a predetermined position in the displayed graph. In this case, the control circuit 4C displays, on the display 4B, the data included in detection information corresponding to the selected predetermined position.

As described above, the search selected detection information is a result of narrowing down, using a search condition, the plurality of pieces of selected detection information. In light of this, an example of how the data is displayed can be understood by referring to FIGS. 14 and 15, described above.

In the above description referring to FIG. 17, only one search condition can be input. It is also possible, however, to input a plurality of search conditions. In the example of FIG. 20, the display 4B displays a screen in which two search conditions can be input.

It is to be noted that in the example of FIG. 20, the "Add search condition" item is displayed on the display 4B. When there is a need for adding a search condition, a user manipulates the manipulation section 4D to click on the "Add search condition" item. This ensures that an additional space in which to input a search condition is displayed on the display 4B.

When a plurality of search conditions have been input, the control circuit 4C searches the plurality of pieces of selected detection information D1, D3, . . . , Di, which are stored in the storage area R2, to select, as search selected detection information, selected detection information including data satisfies the plurality of input search conditions (specifically, AND conditions associated with the plurality of search conditions or OR conditions associated with the plurality of search conditions).

Thus, the machine tool management system according to embodiment 2 also includes the manipulation section 4D, which receives a search condition. The control circuit 4C selects, from among a plurality of pieces of selected detection information, search selected detection information that satisfies the search condition.

This configuration enables users to select, as search selected detection information, desired selected detection information from among a plurality of pieces of selected detection information. This configuration improves the convenience with which the machine tool management system performs, for example, abnormality analysis and identification of a cause of an abnormality in the machine tool 2.

It is to be noted that after step S42 in FIG. 16, a user may manipulate the manipulation section 4D to input a search date range. In this case, from among the plurality of pieces of selected detection information D1, D3, . . . , Di, the control circuit 4C selects selected detection information that satisfy the input search condition. Further, the control circuit 4C refers to time points related to the selected detection information that satisfy the search condition. Then, the control circuit 4C compares the time points with the input search date range; identifies selected detection information, from among the selected detection information that have been selected, that falls within the input search date range; and selects the identified selected detection information as search selected detection information.

Embodiment 3

In embodiment 2, the control circuit 4C searches the plurality of pieces of selected detection information D1, D3, . . . , Di selected at step S4 in FIG. 4 to select, as search selected detection information, selected detection information including data that satisfies a search condition that has been input.

In embodiment 3, from among a plurality of pieces of detection information stored in the storage area R1, detection information that satisfies a search condition received at the manipulation section 4D is selected as search detection information.

As described in embodiment 2, examples of the search condition that can be used include machining-program identification information, alarm identification information, tool identification information, and workpiece identification information.

The machine tool management system according to embodiment 3 has approximately the same configuration as the configuration of the machine tool management system 100 according to embodiment 1 illustrated in FIGS. 1 and 2. In light of this, description of the configuration of the machine tool management system according to embodiment 3 will be omitted here. In the following description, an operation of the machine tool management system according to embodiment 3 will be described in detail using the schematic configurations illustrated in FIGS. 1 and 2.

Embodiment 3 is also approximately the same as embodiment 1 in the operation of storing a plurality of pieces of detection information in the storage area R1 of the memory 4E (see FIG. 6).

Figure 21:
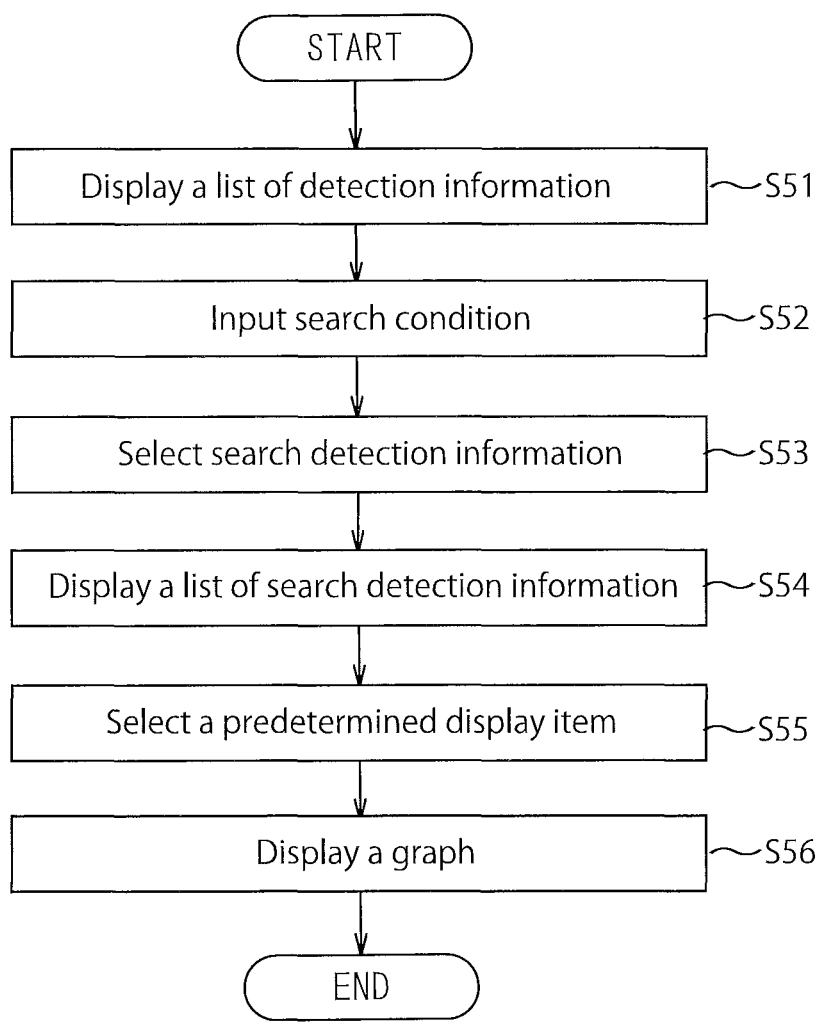
FIG. 21 is a flowchart of a procedure for displaying a graph using search detection information.

FIG. 21 is a flowchart of an operation performed by the machine tool management system according to embodiment 3.

The control circuit 4C reads data browsing software stored in the memory 4E. Then, the control circuit 4C performs control based on the data browsing software (see START in FIG. 21).

In this embodiment, the control circuit 4C reads the plurality of pieces of detection information stored in the storage area R1 of the memory 4E. Then, the control circuit 4C lists the plurality of pieces of read detection information on the display 4B using predetermined items (step S51 in FIG. 21).

For example, as described above by referring to FIG. 6, assume that the plurality of pieces of detection information D1, D2, D3, D4, . . . , DN-1, and DN are stored in the storage area R1 of the memory 4E respectively in relation to the time points, T1, T2, T3, T4, . . . , TN-1, and TN, at which the detection information D1, D2, D3, D4, . . . , DN-1, and DN were detected. In this case, the control circuit 4C reads the plurality of pieces of detection information D1, D2, D3, D4, . . . , DN-1, and DN, which are stored in the storage area R1.

Then, the control circuit 4C displays, on the display 4B, the plurality of pieces of detection information D1, D2, D3, D4, . . . , DN-1, and DN that have been read. On the display 4B, the detection information D1, D2, D3, D4, . . . , DN-1, and DN are displayed in the form of a list using predetermined display items each indicating each piece of the detection information. For example, it is possible to use, as predetermined display items, time points T1, T2, T3, T4, . . . , TN-1, and TN, which are respectively related to the detection information D1, D2, D3, D4, . . . , DN-1, and DN.

Figure 22:
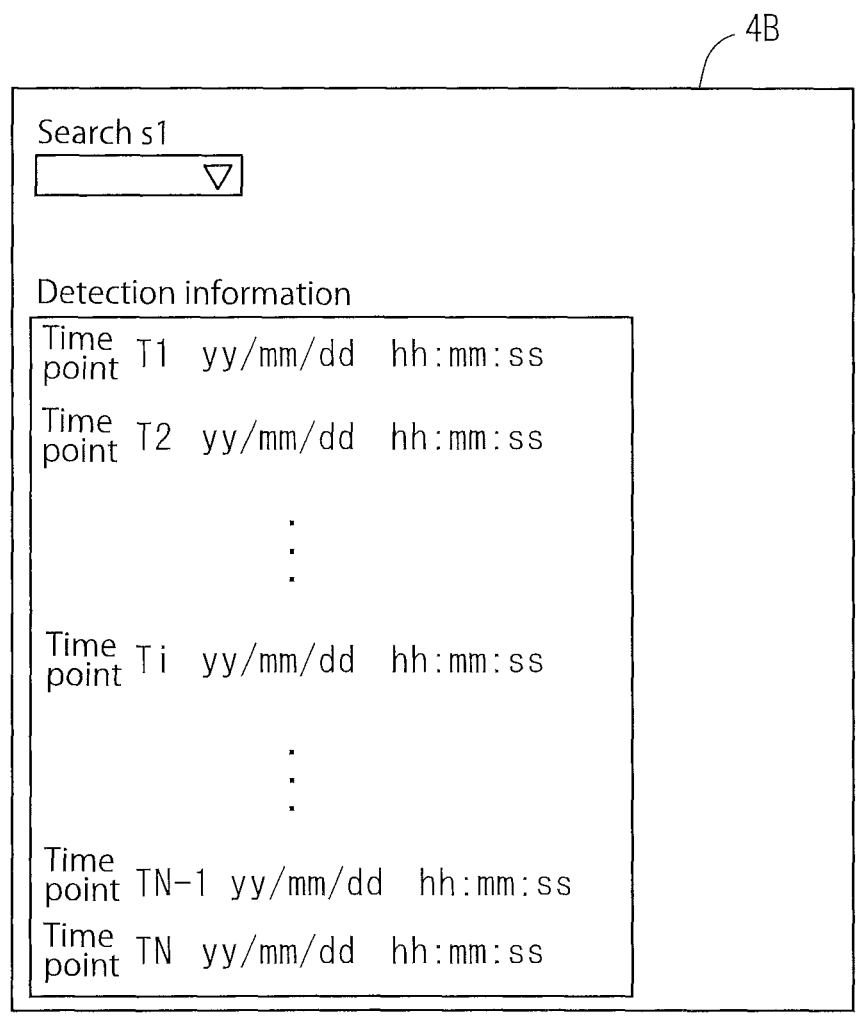
FIG. 22 illustrates another example content displayed on the display.

FIG. 22 illustrates the plurality of pieces of detection information D1, D2, D3, D4, . . . , DN-1, and DN displayed on the display 4B using predetermined display items.

In FIG. 22, the predetermined display items are time points T1, T2, T3, T4, . . . , TN-1, and TN, which are respectively related to the detection information D1, D2, D3, D4, . . . , DN-1, and DN. As described in embodiment 1 as well, each time point is information made up of date and time.

When the content illustrated in FIG. 22 is displayed on the display 4B, the time point T1 indicates the detection information D1, the time point T2 indicates the detection information D2, and the time point TN indicates the detection information DN.

Thus, in the display example illustrated in FIG. 22, the time point T1, which is a display item, is linked to the detection information D1, which is stored in the storage area R1. The time point T2, which is a display item, is linked to the detection information D2, which is stored in the storage area R1. The time point TN, which is a display item, is linked to the detection information DN, which is stored in the storage area R1.

As illustrated in FIG. 22, a "Search" window, in which to input a search condition, is displayed on the display 4B. With the "Search" window displayed on the display 4B, a user manipulates the manipulation section 4D to input a search condition in the "Search" window (step S52 in FIG. 21). It is possible to attach a pull-down mark (∇) to the "Search" window so that one of search conditions set in advance is selected from the pull-down menu and input as a search condition.

As described in embodiment 2, examples of the search condition that can be used include machining-program identification information, alarm identification information, tool identification information, and workpiece identification information. The control circuit 4C recognizes that the manipulation section 4D has received the search condition. Then, the control circuit 4C performs a next operation.

The control circuit 4C determines whether the detection information D1, D2, D3, D4, . . . , DN-1, and DN, which are stored in the memory 4E, include data that satisfy the input search condition.

The control circuit 4C makes this determination for each of the plurality of pieces of detection information D1, D2, D3, D4, . . . , DN-1, and DN, which are stored in the storage area R1. Then, from among the plurality of pieces of detection information D1, D2, D3, D4, . . . , DN-1, and DN, the control circuit 4C selects, as search detection information, detection information including data that satisfies the input search condition (step S53 in FIG. 21).

For example, assume that a search condition indicating a desired machining program has been input in the "Search" window. In this case, the control circuit 4C determines whether the machining condition data d3 of each of the detection information D1, D2, D3, D4, . . . , DN-1, and DN, which are stored in the storage area R1, includes identification data indicating the desired machining program.

Then, assume that the control circuit 4C has detected machining condition data d3 including identification data indicating the desired machining program. In this case, from among the plurality of pieces of detection information D1, D2, D3, D4, . . . , DN-1, and DN, the control circuit 4C selects, as search detection information, detection information that includes the detected machining condition data d3.

It is to be noted that the search condition may be other than machining-program identification information, other examples including alarm identification information, tool identification information, and workpiece identification information.

For example, assume that a tool identification number has been input as a search condition. In this case, from among the plurality of pieces of detection information D1, D2, D3, D4, . . . , DN-1, and DN, the control circuit 4C selects, as search detection information, detection information that includes the tool identification number.

Also assume that an alarm identification number has been input as a search condition. In this case, from among the plurality of pieces of detection information D1, D2, D3, D4, . . . , DN-1, and DN, the control circuit 4C selects, as search detection information, detection information that includes the alarm identification number.

Also assume that a workpiece identification number has been input as a search condition. In this case, from among the plurality of pieces of detection information D1, D2, D3, D4, . . . , DN-1, and DN, the control circuit 4C selects, as search detection information, detection information that includes the workpiece identification number.

Next, the control circuit 4C records the search detection information that has been selected in, for example, the storage area R2 of the memory 4E in relation to the time point at which the search detection information was detected. When a plurality of pieces of search selected detection information have been selected, the control circuit 4C aligns the plurality of pieces of search selected detection information in the storage area R2 in time-series order based on time points respectively related to the plurality of pieces of search selected detection information.

Then, the control circuit 4C controls the display 4B to display the search selected detection information that has been selected on the display 4B using a predetermined display item (such as time point) (step S54 in FIG. 21).

In this respect, when a plurality of pieces of search selected detection information have been selected, the control circuit 4C displays a list of the selected plurality of pieces of search detection information on the display 4B in time-series order using predetermined display items (such as time points).

Figure 23:
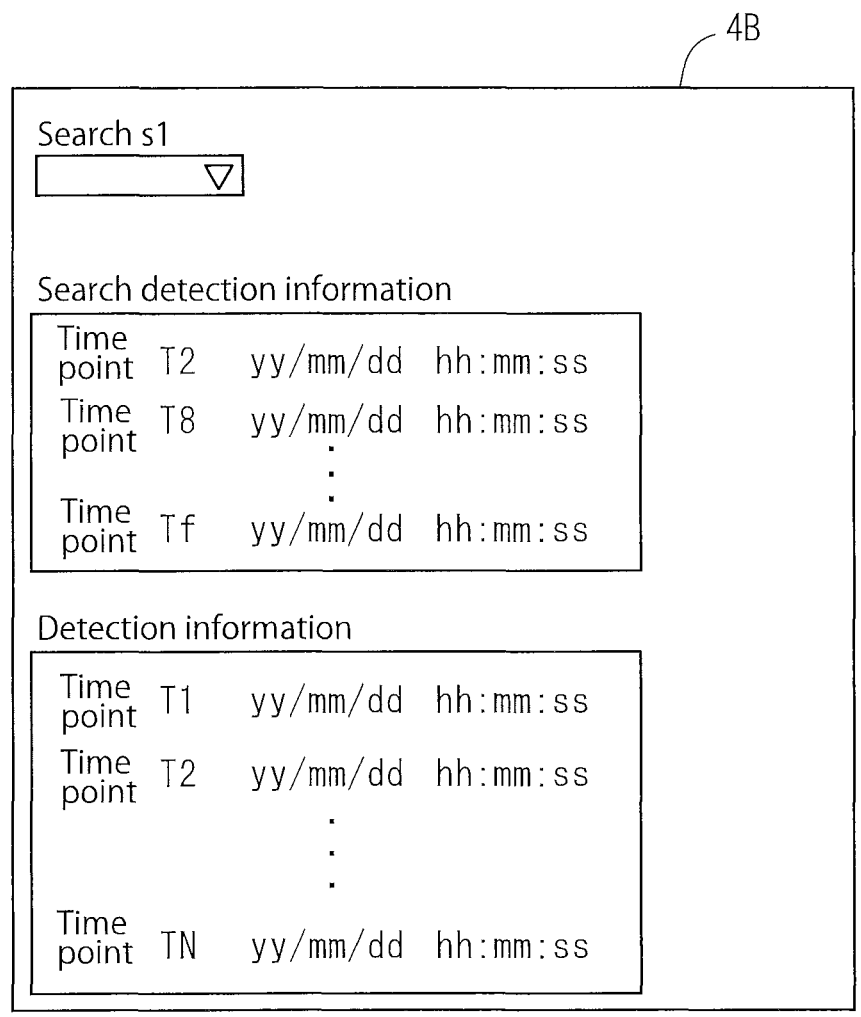
FIG. 23 illustrates another example content displayed on the display.

FIG. 23 illustrates a plurality of pieces of search detection information displayed on the display 4B using predetermined display items (time points respectively related to the search detection information).

As illustrated in FIG. 23, in the "Search detection information" window of the display 4B, predetermined display items (time points) respectively corresponding to the plurality of pieces of search detection information are aligned in time-series order based on the time points. In the "Detection information" window of the display 4B, predetermined display items (time points) respectively corresponding to the plurality of pieces of detection information are aligned in time-series order based on the time points.

In the "Search detection information" window of the display 4B illustrated in FIG. 23, one predetermined display item is selected from among the plurality of predetermined display items (step S55 in FIG. 21).

For example, assume in FIG. 23 that time point Tf has been selected. In this case, as described in embodiment 1 as well, the control circuit 4C makes a graph.

Specifically, the control circuit 4C extracts, from among the plurality of pieces of detection information stored in the storage area R1 of the memory 4E, a plurality of pieces of detection information including search detection information corresponding to the selected one predetermined display item (time point Tf). The extracted plurality of pieces of detection information are detection information detected within a predetermined period of time including the selected time point Tf.

Then, using the data included in the extracted plurality of pieces of detection information, the control circuit 4C makes a graph of a change over time of the data. The detection information includes a plurality of data.

For example, assume that there is a need for displaying a graph of a change over time of vibration acceleration of the tool spindle $2a1$. In this case, the control circuit 4C extracts, from each piece of the detection information, physical quantity data d1 that indicates a value of "vibration acceleration of the tool spindle $2a1$". Then, the control circuit 4C makes a graph of a change over time using the extracted pieces of physical quantity data d1 that indicate values of "vibration acceleration of the tool spindle $2a1$".

Figure 24:
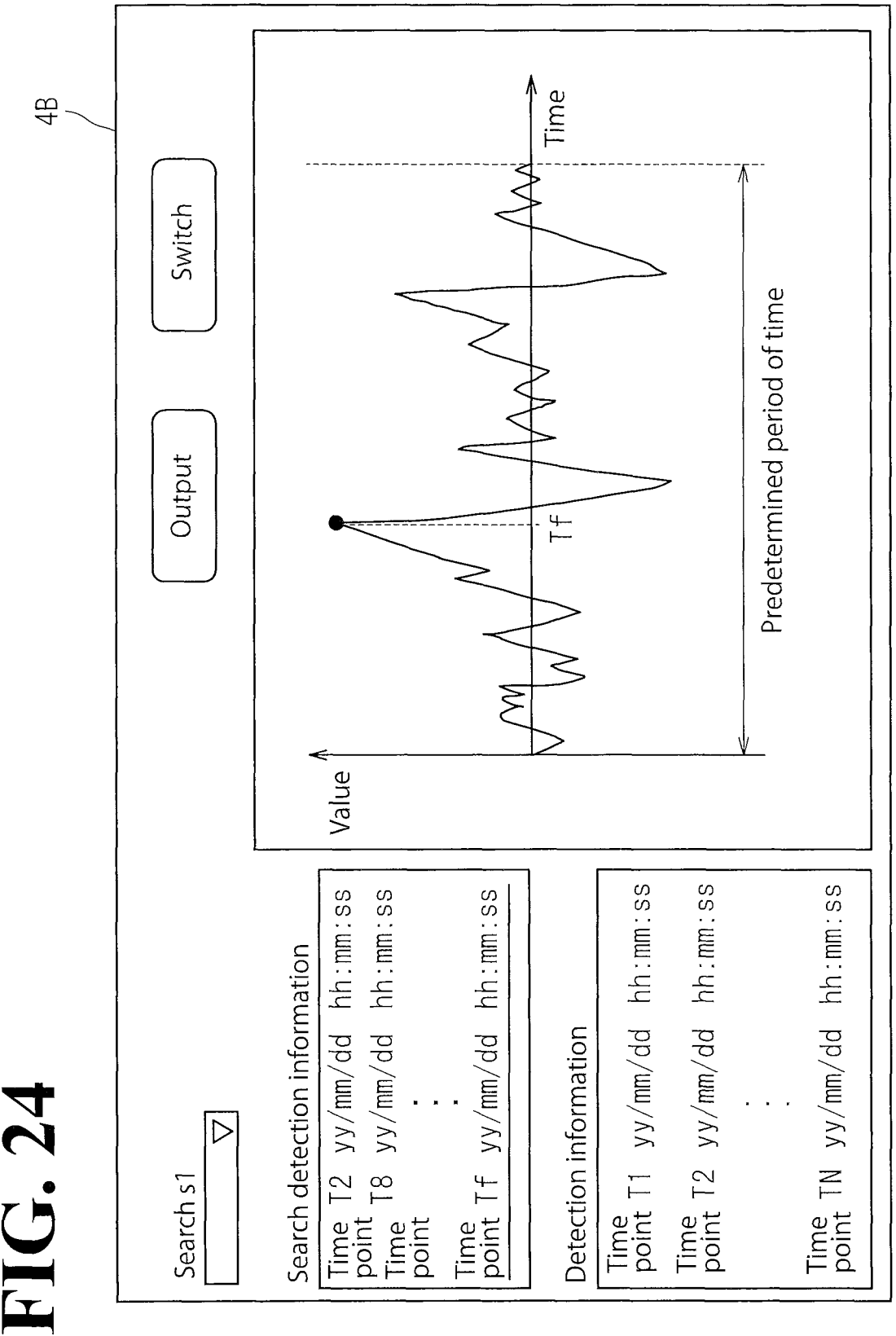
FIG. 24 illustrates another example content displayed on the display.

Then, the control circuit 4C displays the graph that has been made on the display 4B (step S56 in FIG. 21). FIG. 24 illustrates an example of the graph displayed on the display 4B. In the display content illustrated in FIG. 24, the display content illustrated in FIG. 23 is included, in addition to the graph.

Similarly to embodiment 1, the control circuit 4C may emphasize the position of the data included in the search detection information selected by a user at step S55 using the graph displayed on the display 4B so that the position is distinguished from other positions.

As described above, upon selection of the time point Tf, the position of the data included in the search detection information related to the time point Tf is emphasized. In the graph illustrated in FIG. 24, the position corresponding to the time point Tf is displayed with a black filled circle.

The operation illustrated in FIG. 21 of displaying a graph has been described above. The management apparatus 4 is also capable of making the following display.

As described in embodiment 1, a user may manipulate the manipulation section 4D to make a "graph switching" instruction (for example, assume that the user has clicked on the "Switch" icon illustrated in FIG. 24). In this case, the control circuit 4C displays a plurality of kinds of graphs on the display 4B using the data included in a plurality of pieces of detection information including the search detection information selected at step S55 (see FIG. 25). As seen from the above description, the plurality of pieces of detection information are detection information detected within the predetermined period of time including the time point related to the search detection information selected at step S55.

Figure 25:
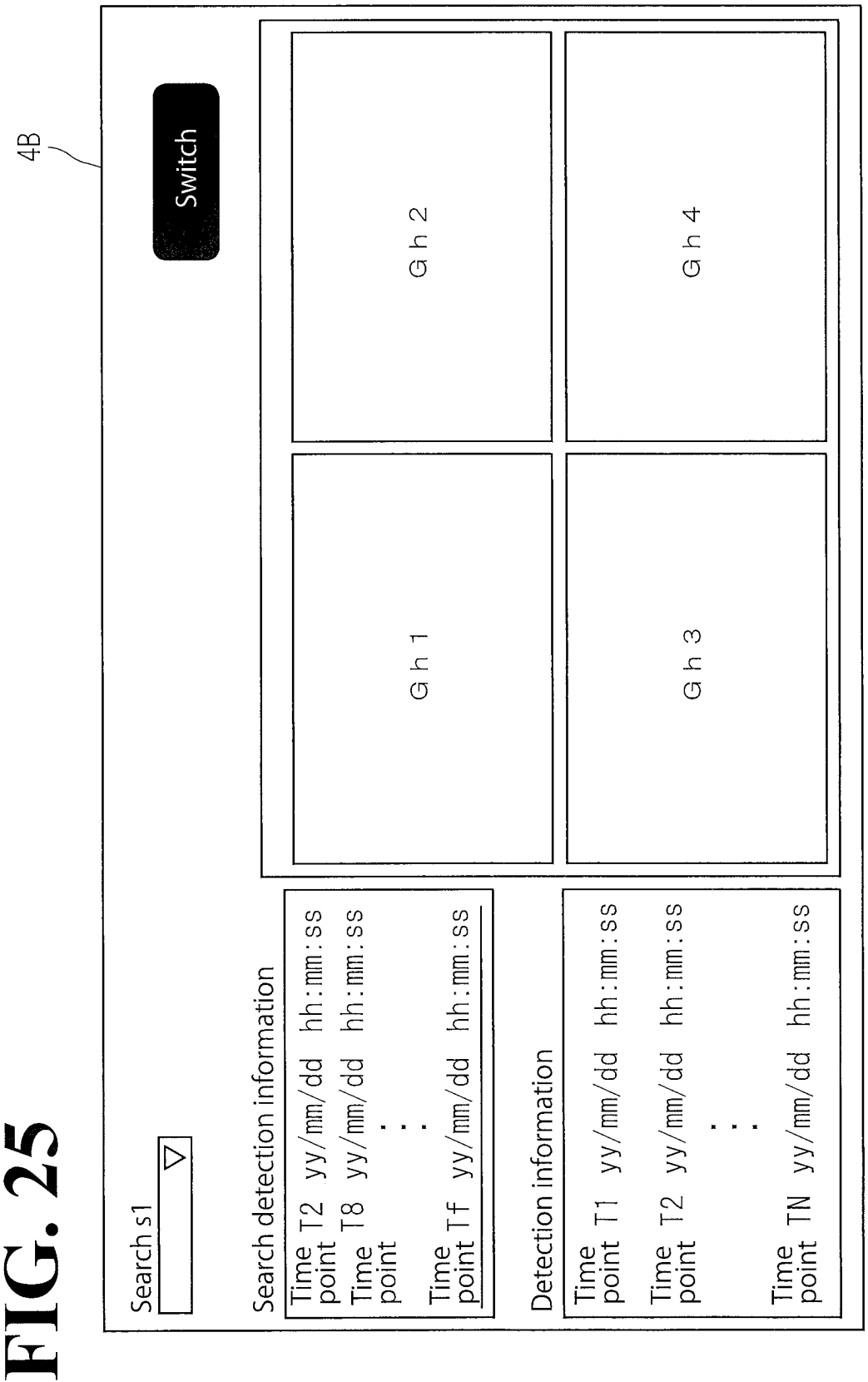
FIG. 25 illustrates another example content displayed on the display.

In the example of FIG. 25, the search detection information related to the time point Tf is selected, and a plurality of pieces of detection information detected within a predetermined period of time including the time point Tf are extracted. Then, using the data included in the detection information, a plurality of graphs Gh1, Gh2, Gh3, and Gh4, each indicating a change over time, are made and displayed. It is to be noted that the number and type of graphs to be displayed may be freely determined by a user. It is also to be noted that in the example of FIG. 25, the waveforms of the graphs Gh1 to Gh4 are omitted.

As described in embodiment 1, assume that a user has manipulated the manipulation section 4D to click on the "Output" icon illustrated in, for example, FIG. 24. In this case, as described in embodiment 1 as well, the control circuit 4C makes a tabular format file using predetermined data, and stores the tabular format file in the memory 4E. It is also possible to display the tabular format file in the form of a table on the display 4B or another monitor. The table is made using the data included in the plurality of pieces of detection information detected at step S55 within the predetermined period of time. An example of how the table is displayed can be understood by referring to FIG. 12, described above.

As described in embodiment 1, a user may manipulate the manipulation section 4D to select a predetermined position in each displayed graph. In this embodiment, the graphs are made using the data included in the plurality of pieces of detection information that include the search detection information selected at step S55 and that were detected within a predetermined period of time.

Figure 26:
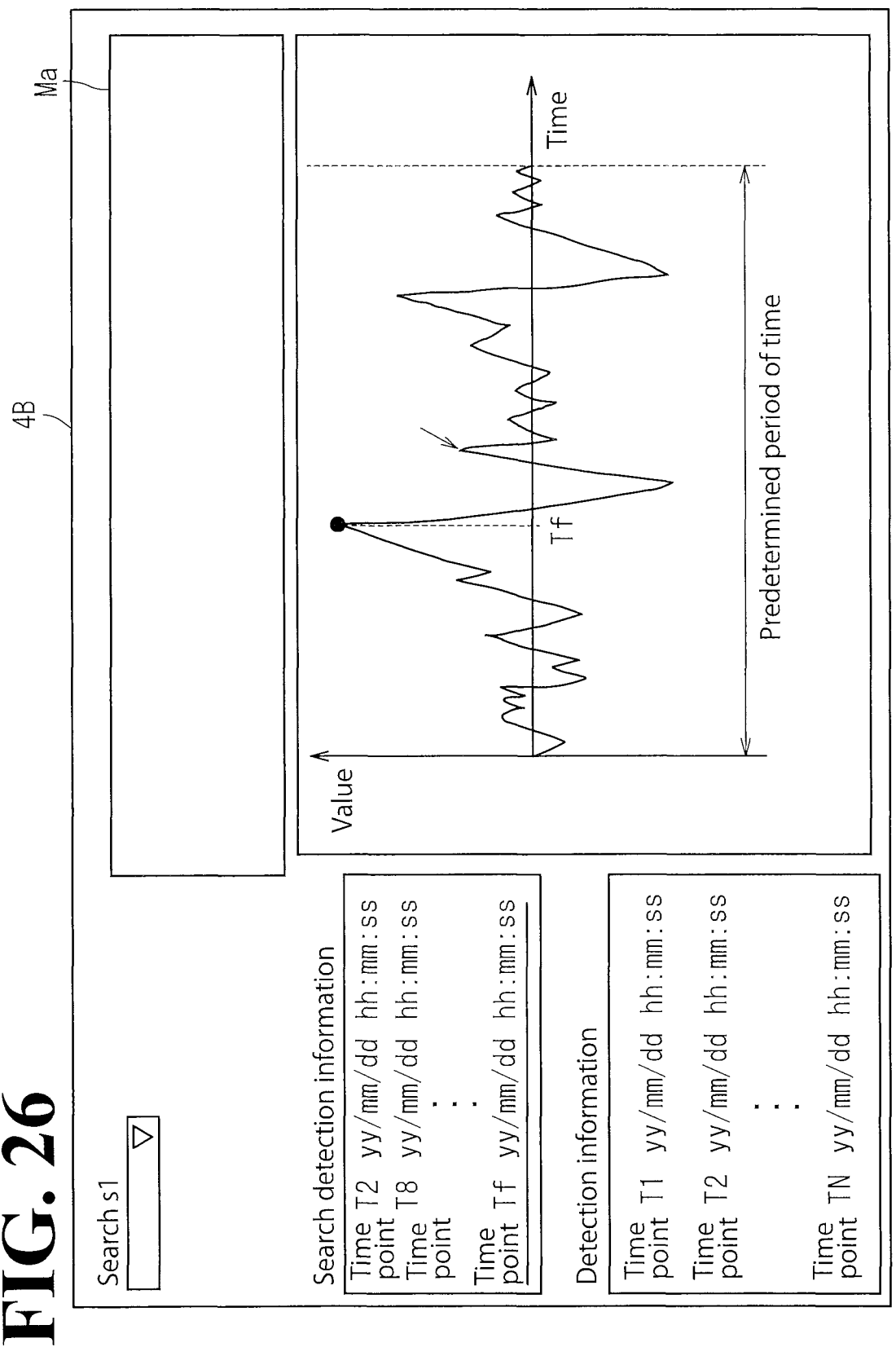
FIG. 26 illustrates another example content displayed on the display.

In this case, as described in embodiment 1, the control circuit 4C displays, on the display 4B, the data included in the detection information corresponding to the selected predetermined position. FIG. 26 illustrates an example content displayed after a predetermined position has been selected in the graph.

In FIG. 26, the arrow illustrated in the graph indicates the position selected by a user. As illustrated in FIG. 26, which illustrates an example content displayed after a predetermined position has been selected in the graph, the display 4B displays data Ma. The data Ma is included in the detection information (point detection information) including the data indicated by the arrow. In the display content illustrated in FIG. 26, the display content illustrated in FIG. 23 is included.

In the example of FIG. 26, examples of displayed items of the data Ma include: some pieces of the physical quantity data d1 included in the point detection information; and the machining condition data d3 included in the point detection information (for example, workpiece identification number and spindle identification number, which are part of the machining condition data d3). It is to be noted that a user may freely determine which data of the plurality of pieces of data included in the point detection information to display as the data Ma.

As described in embodiment 1 by referring to FIG. 15, the display 4B may also display the content of the machining program included in the machining condition data d3 of the point detection information, in addition to the data Ma, which is included in the point detection information.

Thus, the machine tool management system according to embodiment 3 includes the machine tool 2, the memory 4E, and the control circuit 4C. The machine tool management system also includes the manipulation section 4D, which receives a search condition. The control circuit 4C selects, from among the plurality of pieces of detection information stored in the memory 4E, search detection information that satisfies the search condition. Further, the control circuit 4C records the plurality of pieces of search detection information in the memory 4E respectively in relation to the time points at which the plurality of pieces of search detection information were detected.

This configuration enables users to select, as search detection information, desired detection information from a large number of pieces of detection information. This configuration improves the convenience with which the machine tool management system performs, for example, abnormality analysis and identification of a cause of an abnormality in the machine tool 2. As a result, a cause of a machining failure is easily identified.

In the above description, only one search condition can be input. It is also possible, however, to input a plurality of search conditions, similarly to embodiment 2. When a plurality of search conditions have been input, the control circuit 4C searches the plurality of pieces of detection information stored in the storage area R1 to select, as search detection information, detection information including data that satisfies the plurality of input search conditions (specifically, AND conditions associated with the plurality of search conditions or OR conditions associated with the plurality of search conditions).

After step S52 in FIG. 21, a user may manipulate the manipulation section 4D to input a search date range. In this case, from among the plurality of pieces of detection information, the control circuit 4C selects detection information that satisfy the input search condition. Further, the control circuit 4C refers to time points related to the detection information that satisfy the search condition. Then, the control circuit 4C compares the time points with the input search date range; identifies detection information, from among the detection information that have been selected, that falls within the input search date range; and selects the identified detection information as search detection information.

The machine tool 2 will not be limited to those described in the above embodiments. Other examples of the machine tool 2 include a lathe, a milling machine, a machining center, a laser beam machine, an additive manufacturer, a friction stir welder, or a combination of the foregoing.

Obviously, numerous modifications and variations of the present invention are possible in light of the above teachings. It is therefore to be understood that within the scope of the appended claims, the present invention may be practiced otherwise than as specifically described herein.

What is claimed is:

1. A machine tool management system comprising:
   a machine tool configured to machine a workpiece;
   a memory;
   a display;
   a detector configured to detect a physical quantity; and
   a control circuit connected to the memory and configured to:
      record, in the memory, a time point at which detection information with respect to the machine tool has been detected and the detection information corresponding to the time point, the detection information including the physical quantity;
      compare the physical quantity included in the detection information with an abnormality determination threshold;
      determine selected detection information among the detection information, the selected detection information satisfying a determination condition in which the physical quantity is in excess of the abnormality determination threshold;
      record, in the memory, the selected detection information corresponding to the time point;
      display, on the display, a list of the selected detection information according to predetermined display items, unselected detection information being excluded from the list, the unselected detection information being other than the selected detection information among the detection information;

extract from the memory at least part of the detection information including one of the selected detection information corresponding to one display item selected among the display items listed on the display; and display, on the display, a graph of a change over time in data included in the at least part of the detection information such that data included in the one of the selected detection information is distinguishable in the graph.

2. The machine tool management system according to claim 1, wherein the control circuit is configured to align each of the selected detection information in the memory based on the time point related to the each of the selected detection information.

3. The machine tool management system according to claim 1, wherein upon selection of a predetermined position in the graph, the control circuit is configured to display, on the display, data included in detection information corresponding to the selected predetermined position.

4. The machine tool management system according to claim 1, wherein the display item comprises a time point related to the selected detection information.

5. The machine tool management system according to claim 1,
wherein the detector is configured to detect an additional physical quantity,
wherein the machine tool management system comprises an additional abnormality determination threshold corresponding to the additional physical quantity, and
wherein the control circuit is configured to:
compare the additional physical quantity included in the detection information with the additional abnormality determination threshold; and
determine the detection information including the detected physical quantity as the selected detection information when the additional physical quantity is in excess of the additional abnormality determination threshold.

6. The machine tool management system according to claim 1, further comprising:
an alarm raiser configured to raise an alarm, the detection information including alarm information associated with an alarm-causing occurrence detected by the alarm raiser.

7. The machine tool management system according to claim 6, wherein the control circuit is configured to determine, as the selected detection information, detection information including the alarm information indicating the alarm-causing occurrence.

8. The machine tool management system according to claim 1, further comprising:
a manipulation section configured to receive a search condition,
wherein the control circuit is configured to select, from among the selected detection information, one search selected detection information that satisfies the search condition received at the manipulation section.

9. The machine tool management system according to claim 1, further comprising:
a manipulation section configured to receive a search condition; and a control circuit connected to the memory and configured to:
select, from among the selected detection information, one search selected detection information that satisfies the search condition received at the manipulation section; and
record, in the memory, the search detection information in relation to time points at which the search detection information have been detected.

10. A method for managing a machine tool, the method comprising:
detecting a physical quantity;
recording, in a memory, a time point at which detection information with respect to the machine tool has been detected and the detection information corresponding to the time point, the detection information including the physical quantity;
comparing the physical quantity included in the detection information with an abnormality determination threshold;
determining selected detection information among the detection information, the selected detection information satisfying a determination condition in which the physical quantity is in excess of the abnormality determination threshold;
recording, in the memory, the selected detection information corresponding to the time point;
displaying, on the display, a list of the selected detection information according to predetermined display items, unselected detection information being excluded from the list, the unselected detection information being other than the selected detection information among the detection information;
extracting from the memory at least part of the detection information including one of the selected detection information corresponding to one display item selected among the display items listed on the display; and
displaying, on the display, a graph of a change over time in data included in the at least part of the detection information such that data included in the one of the selected detection information is distinguishable in the graph.

11. A machine tool management system comprising:
a machine tool configured to machine a workpiece;
a memory;
a display;
a detector configured to detect a physical quantity; and
a control circuit connected to the memory and configured to:
record, in the memory, detection information detected from the machine tool in relation to a time point at which the detection information was detected, the detection information including the physical quantity;
compare the physical quantity included in the detection information with an abnormality determination threshold;
determine whether the detection information is selected detection information that satisfies a predetermined determination condition in which the physical quantity is in excess of the abnormality determination threshold;
record, in the memory, a plurality of pieces of the selected detection information respectively in relation to time points at which the plurality of pieces of the selected detection information were detected;

display, on the display, a list of at least one piece of selected detection information among the plurality of pieces of the selected detection information using a predetermined display item, unselected detection information being excluded from the list, the unselected detection information being other than the selected detection information among the detection information;

upon selection of one predetermined display item from among a plurality of predetermined display items listed on the display, extract from the memory a plurality of pieces of detection information including one piece of selected detection information, among the plurality of pieces of the selected detection information, that corresponds to the selected one predetermined display item;

make a graph of a change over time of data included in the plurality of pieces of extracted detection information;

display the graph on the display; and in the graph, display a position corresponding to data included in the selected one piece of detection information corresponding to the selected one predetermined display item such that the position is distinguished from another position.

* * * * *